(12) United States Patent
Kim et al.

(10) Patent No.: US 11,012,187 B1
(45) Date of Patent: May 18, 2021

(54) ERROR CORRECTION IN OPTICAL NETWORKS WITH PROBABILISTIC SHAPING AND SYMBOL RATE OPTIMIZATION

(71) Applicant: Fujitsu Limited, Kawasaki (JP)

(72) Inventors: Inwoong Kim, Allen, TX (US); Olga I. Vassilieva, Plano, TX (US); Paparao Palacharla, Richardson, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 16/809,221

(22) Filed: Mar. 4, 2020

(51) Int. Cl.
*H04L 1/00* (2006.01)
*H04B 10/54* (2013.01)
*H04B 10/27* (2013.01)

(52) U.S. Cl.
CPC .......... *H04L 1/0063* (2013.01); *H04B 10/27* (2013.01); *H04B 10/541* (2013.01)

(58) Field of Classification Search
None
See application file for complete search history.

(56) References Cited

U.S. PATENT DOCUMENTS

| 9,673,907 | B1 * | 6/2017 | Vassilieva | ........ H04B 10/07953 |
| 10,091,046 | B1 * | 10/2018 | Lefevre | .................. H04L 1/0041 |
| 2018/0367246 | A1 * | 12/2018 | Kakande | ............... H04L 1/0042 |
| 2020/0044770 | A1 * | 2/2020 | Lefevre | .................... H04J 1/045 |

FOREIGN PATENT DOCUMENTS

EP   3474470 A1 *   4/2019   ......... H04B 10/5055

OTHER PUBLICATIONS

Poggiolini, Pierluigi, et al., "Analytical and Experimental Results on System Maximum Reach Increase Through Symbol Rate Optimization," Journal of Lightwave Technology, vol. 343, No. 8, Apr. 15, 2016, 14 pgs, Apr. 15, 2016.
Che, Di, et al., "Entropy-Loading: Multi-Carrier Constellation-Shaping for Colored-SNR Optical Channels," OFC, 2017, 3 pgs, 2017.
Buchali, Fred., "Rate Adaptation and Reach Increase by Probabilistically Shaped 64-QAM: An Experimental Demonstration," Journal of Lightwave Technology, vol. 34, No. 7, Apr. 1, 2016. 11 pgs, Apr. 1, 2016.

* cited by examiner

*Primary Examiner* — David W Lambert
(74) *Attorney, Agent, or Firm* — Baker Botts L.L.P.

(57) ABSTRACT

An optical transmitter for probabilistic shaping and symbol rate optimization includes one or more matcher elements, each configured to assign respective probabilities to symbols represented in received binary data dependent on a target probability distribution and to output a respective shaped bit sequence. The optical transmitter further includes a single systematic error correction encoder configured to add parity bits collectively across the shaped bit sequences and to output a combined shaped bit sequence including data representing the shaped bit sequences and the added parity bits. The optical transmitter also includes multiple mapping elements, each configured to generate a respective codeword for each symbol represented in a portion of the combined shaped bit sequence, a serial-to-parallel converter to provide portions of the combined shaped bit sequence to the mapping elements, and a multiplexer to combine binary data representing the codewords for transmission using subcarrier multiplexing.

20 Claims, 16 Drawing Sheets

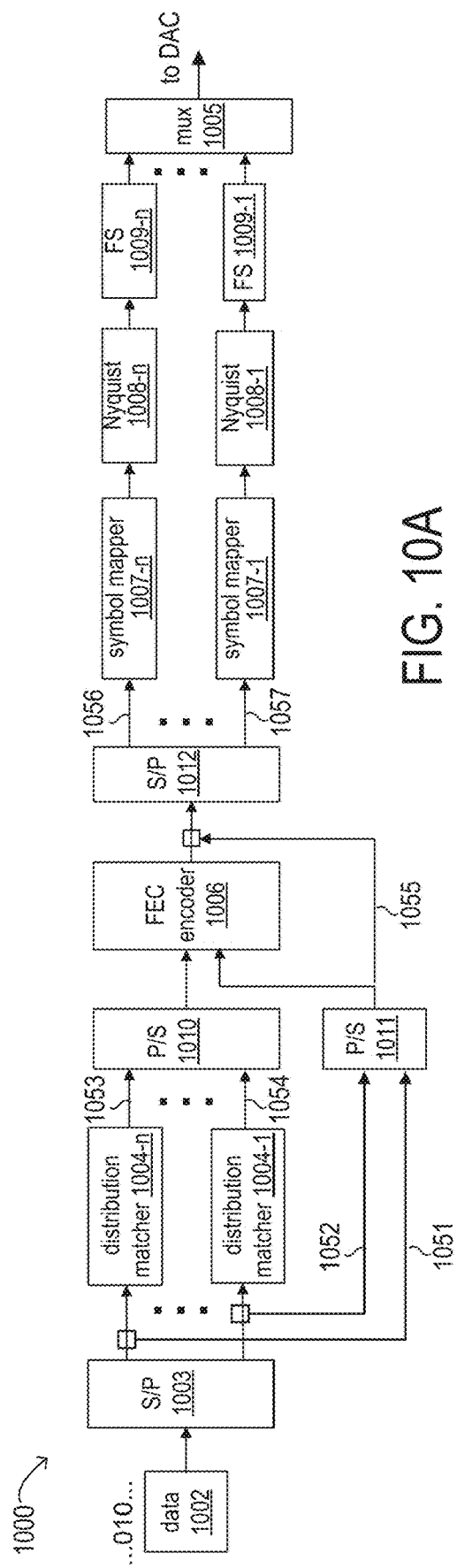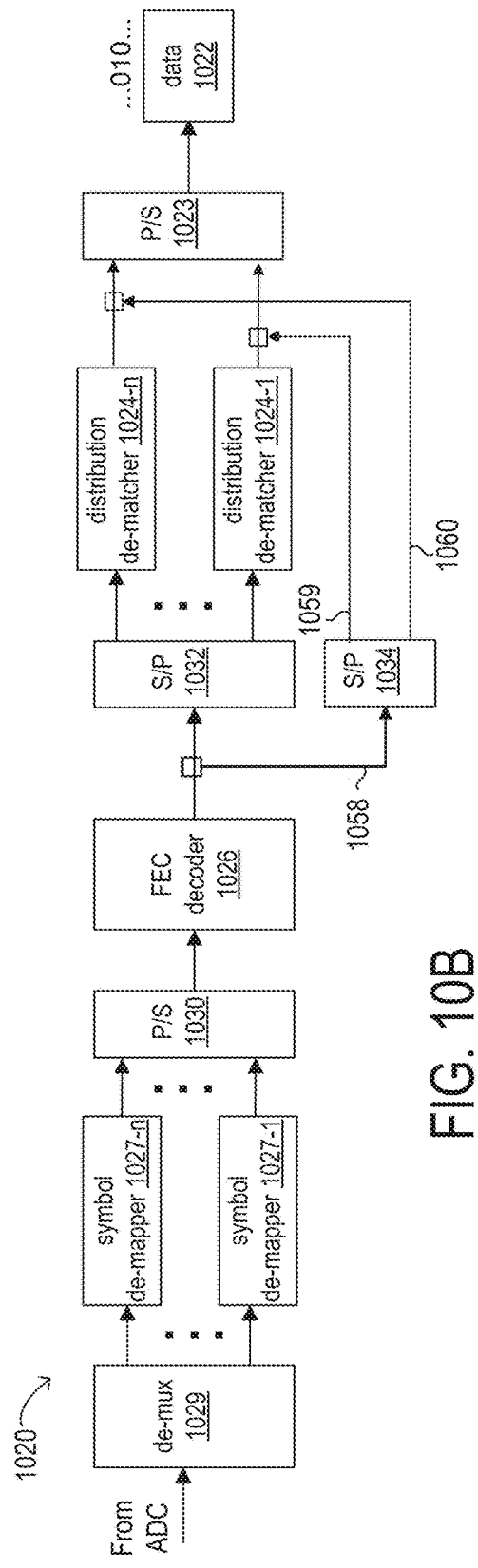
FIG. 10A
FIG. 10B

ERROR CORRECTION IN OPTICAL NETWORKS WITH PROBABILISTIC SHAPING AND SYMBOL RATE OPTIMIZATION

BACKGROUND

Field of the Disclosure

The present disclosure relates generally to optical communication networks and, more particularly, to error correction in optical networks that implement both probabilistic shaping and symbol rate optimization.

Description of the Related Art

Telecommunications systems, cable television systems and data communication networks use optical networks to rapidly convey large amounts of information between remote points. In an optical network, information is conveyed in the form of optical signals through optical fibers. Optical networks may also include various network nodes such as amplifiers, dispersion compensators, multiplexer/demultiplexer filters, wavelength selective switches, couplers, etc. to perform various operations within the network.

Optical superchannels are an emerging solution for transmission of optical signals at 400 Gb/s and 1 Tb/s data rate per channel, and hold promise for even higher data rates in the future. A typical superchannel includes a set of subcarriers that are frequency multiplexed to form a single wavelength channel. The superchannel may then be transmitted through an optical network as a single channel across network endpoints. The subcarriers within the superchannel are tightly packed to achieve high spectral efficiency, enabling superchannels to achieve an increase in data capacity. However, the reach of optical signals, even when using superchannels, may still be limited by optical signal-to-noise ratio (OSNR) levels experienced during transmission. In some systems, in order to extend the transmission reach of certain optical signals, such as high capacity optical signals modulated using an advanced modulation format, constellation shaping or symbol rate optimization is applied to the optical signals.

SUMMARY

In one aspect, an optical transmitter for probabilistic shaping and symbol rate optimization includes one or more matcher elements, each configured to assign respective probabilities to symbols of an M-QAM constellation of a given M-QAM modulation format in the complex plane represented in binary data received by the matcher element, the assignment being dependent on a target probability distribution for the symbols and to output a respective shaped bit sequence corresponding to the binary data received by the matcher element. The optical transmitter further includes a single systematic error correction encoder configured to add parity bits to the respective shaped bit sequences collectively across the respective shaped bit sequences and to output a first combined shaped bit sequence including data representing the respective shaped bit sequences and the collectively added parity bits. The optical transmitter also includes a plurality of mapping elements, each configured to generate a respective codeword for each symbol represented in a received portion of the first combined shaped bit sequence, a first serial-to-parallel converter configured to provide a respective portion of the first combined shaped bit sequence to each of the plurality of mapping elements, and a multiplexer configured to combine binary data representing the respective codewords generated by the plurality of mapping elements for transmission over an optical transmission path using subcarrier multiplexing.

In any of the disclosed embodiments, the one or more matcher elements may include two or more matcher elements, and the optical transmitter may further include a first parallel-to-serial converter configured to combine the respective shaped bit sequences output by the two or more matcher elements to generate binary data representing a second combined shaped bit sequence and to provide the binary data representing the second combined shaped bit sequence to the single systematic error correction encoder as input.

In any of the disclosed embodiments, the optical transmitter may further include a second serial-to-parallel converter configured to provide respective portions of binary data received by the optical transmitter to each of the two more matcher elements in parallel binary data streams and a plurality of tap elements. Each tap element may be configured to tap one or more bits from each of the parallel binary data streams and to provide the one or more tapped bits to the second parallel-to-serial converter. The second parallel-to-serial converter may be further configured to provide the one or more tapped bits received from each of the plurality of tap elements to the single systematic error correction encoder as parity bits to be added collectively across the respective shaped bit sequences output by the two or more matcher elements. In some embodiments, the optical transmitter may further include a combining element. Each of the tap elements may be further configured to provide the one or more tapped bits to the combining element and the combining element may be configured to integrate the tapped bits provided by the tap elements into the first combined shaped bit sequence prior to providing the first combined shaped bit sequence to the first serial-to-parallel converter as input.

In any of the disclosed embodiments, the optical transmitter may further include a second serial-to-parallel converter configured to provide respective portions of serial binary data received by the optical transmitter to each of the two more matcher elements in parallel binary data streams and a tap element configured to tap one or more bits from the serial binary data received by the optical transmitter prior to converting the serial binary data to the parallel binary data streams and to provide the one or more tapped bits to the single systematic error correction encoder as parity bits to be added collectively across the respective shaped bit sequences output by the two or more matcher elements. In some embodiments, the optical transmitter may further include a combining element. The tap element may be further configured to provide the one or more tapped bits to the combining element and the combining element may be configured to integrate the tapped bits provided by the tap element into the first combined shaped bit sequence prior to providing the first combined shaped bit sequence to the first serial-to-parallel converter as input.

In any of the disclosed embodiments, the one or more matcher elements may include a single matcher element.

In any of the disclosed embodiments, the single systematic error correction encoder may be communicatively coupled to the single matcher element and may be configured to receive a shaped bit sequence corresponding to the binary data received by the single matcher element from the single matcher element and to provide a respective portion of the first combined shaped bit sequence to each of the plurality of mapping elements, the first serial-to-parallel converter is configured to apply symbol-wise interleaving to the first combined shaped bit sequence.

In any of the disclosed embodiments, the optical transmitter may further include a bitwise interleaving element configured to receive the first combined shaped bit sequence from the single matcher element, to apply bitwise interleaving to the first combined shaped bit sequence to generate binary data representing a second combined shaped bit sequence, and to provide the binary data representing the second combined shaped bit sequence to the single systematic error correction encoder as input.

In some embodiments, an optical receiver that receives transmissions from the optical transmitter over the optical transmission path may include a single error correction decoder configured to receive binary data representing the first combined shaped bit sequence, to extract the collectively added parity bits from the binary data representing the first combined shaped bit sequence, and to output a third combined shaped bit sequence from which the collectively added parity bits have been extracted. In some embodiments, the optical receiver may include two or more de-matcher elements and a second serial-to-parallel converter configured to receive the third combined shaped bit sequence output by the single error correction decoder and to provide respective portions of the third combined shaped bit sequence to each of the two or more de-matcher elements. Each de-matcher element may be configured to receive a respective portion of the third combined shaped bit sequence and to recover binary data representing information transmitted by the optical transmitter from the respective portion of the third combined shaped bit sequence. In some embodiments, the optical receiver may include a single de-matcher element configured to receive the second combined shaped bit sequence and to recover binary data representing information transmitted by the optical transmitter from the second combined shaped bit sequence.

In another aspect, a method for error correction in optical networks with probabilistic shaping and symbol rate optimization includes receiving binary data to be transmitted as an optical signal, assigning, by each of one or more matcher elements, respective probabilities to symbols of an M-QAM constellation of a given M-QAM modulation format in the complex plane represented in a portion of the received binary data provided to the matcher element, the assigning being dependent on a target probability distribution for the symbols, outputting, by each of the one or more matcher elements, a respective shaped bit sequence corresponding to the portion of the received binary data provided to the matcher element, adding, collectively across the respective shaped bit sequences, parity bits to the respective shaped bit sequences to generate a first combined shaped bit sequence including data representing the respective shaped bit sequences and the collectively added parity bits, providing a respective portion of the combined shaped bit sequence to each of a plurality of mapping elements, each mapping element being configured to generate a respective codeword for each symbol represented in the respective portion of the combined shaped bit sequence provided to the mapping element, and combining binary data representing the respective codewords generated by the plurality of mapping elements for transmission over an optical transmission path using subcarrier multiplexing.

In any of the disclosed embodiments, the one or more matcher elements may include two or more matcher elements and the method may further include combining the respective shaped bit sequences output by the two or more matcher elements to generate binary data representing a second combined shaped bit sequence. Adding, collectively across the respective shaped bit sequences, parity bits to the respective shaped bit sequences may include adding the parity bits to the second combined shaped bit sequence.

In any of the disclosed embodiments, the method may further include receiving, via the optical transmission path, binary data representing the first combined shaped bit sequence, extracting the collectively added parity bits from the binary data representing the first combined shaped bit sequence, outputting a third combined shaped bit sequence from which the collectively added parity bits have been extracted, providing respective portions of the third combined shaped bit sequence to each of two or more de-matcher elements, and recovering, by each of the two or more de-matcher elements and from the respective portion of the third combined shaped bit sequence, binary data representing information received via the optical transmission path.

In any of the disclosed embodiments, the method may further include providing, to each of the two more matcher elements in parallel binary data streams, respective portions of serial binary data received for transmission and tapping one or more bits from each of the parallel binary data streams. Adding, collectively across the respective shaped bit sequences, parity bits to the respective shaped bit sequences may further include adding, to the second combined shaped bit sequence, the one or more tapped bits received from each of the plurality of tap elements as additional parity bits.

In any of the disclosed embodiments, the method may further include providing, to each of the two more matcher elements in parallel binary data streams, respective portions of serial binary data received for transmission and tapping one or more bits from the serial binary data received by the optical transmitter prior to converting the serial binary data to the parallel binary data streams. Adding, collectively across the respective shaped bit sequences, parity bits to the respective shaped bit sequences may further include adding, to the second combined shaped bit sequence, the one or more tapped bits from the received serial binary data as additional parity bits.

In any of the disclosed embodiments, the one or more matcher elements may include a single matcher element.

In any of the disclosed embodiments, the method may further include receiving, via the optical transmission path, binary data representing the first combined shaped bit sequence, extracting the collectively added parity bits from the binary data representing the first combined shaped bit sequence, outputting a second combined shaped bit sequence from which the collectively added parity bits have been extracted, providing the second combined shaped bit sequence to a single de-matcher element, and recovering, by the single de-matcher element and from the second combined shaped bit sequence, binary data representing information received via the optical transmission path.

In any of the disclosed embodiments, providing a respective portion of the combined shaped bit sequence to each of the plurality of mapping elements may include applying symbol-wise interleaving to the first combined shaped bit sequence.

In any of the disclosed embodiments, the method may further include receiving the first combined shaped bit sequence from the single matcher element and applying bitwise interleaving to the first combined shaped bit sequence to generate binary data representing a second combined shaped bit sequence. Adding, collectively across the respective shaped bit sequences, parity bits to the respective shaped bit sequences may include adding parity bits to the second combined shaped bit sequence.

In any of the disclosed embodiments, the number of mapping elements may be equal to a number of subcarrier channels selected for symbol rate optimization and may be dependent on characteristics of transmission media for the optical transmission path and a target reach for the transmission.

BRIEF DESCRIPTION OF THE DRAWINGS

For a more complete understanding of the present invention and its features and advantages, reference is now made to the following description, taken in conjunction with the accompanying drawings, in which:

FIG. 10A is a schematic diagram illustrating selected elements of a transmitter portion of an example optical transmission system configured to apply probabilistic constellation shaping and symbol rate optimization and including multiple distribution matchers and tap elements on multiple binary data streams, according to some embodiments;

FIG. 10B is a schematic diagram illustrating selected elements of a receiver portion of an example optical transmission system configured to recover information from optical signals received from the transmitter portion depicted in FIG. 10A, according to some embodiments;

DESCRIPTION OF THE EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Figure 1:
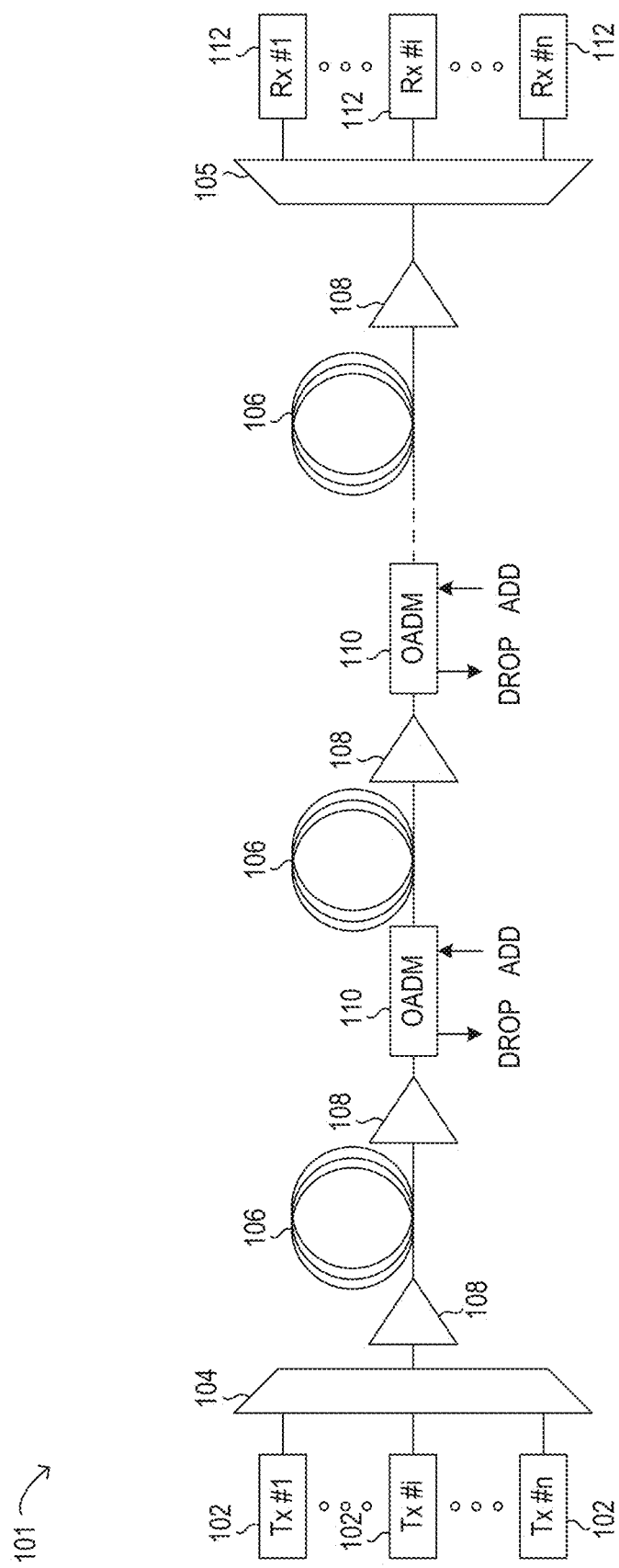
FIG. 1 is a block diagram of selected elements of an embodiment of an optical transport network.

Referring now to the drawings, FIG. 1 illustrates an example embodiment of optical transport network (OTN) 101, which may represent an optical communication system. Optical transport network 101 includes one or more optical fibers 106 to transport one or more optical signals communicated by components of optical transport network 101. The network elements of optical transport network 101, coupled together by fibers 106, may comprise one or more transmitters (Tx) 102, one or more multiplexers (MUX) 104, one or more optical amplifiers 108, one or more optical add/drop multiplexers (OADM) 110, one or more de-multiplexers (DEMUX) 105, and one or more receivers (Rx) 112.

Optical transport network 101 may comprise a point-to-point optical network with terminal nodes, a ring optical network, a mesh optical network, or any other suitable optical network or combination of optical networks. Optical transport network 101 may be used in a short-haul metropolitan network, a long-haul inter-city network, or any other suitable network or combination of networks. The capacity of optical transport network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a standard Single-Mode Fiber (SMF), Enhanced Large Effective Area Fiber (E-LEAF), or TrueWave® Reduced Slope (TW-RS) fiber, among others.

Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a "channel" that is included in an optical signal. Each channel may carry a certain amount of information through optical transport network 101.

To increase the information capacity and transport capabilities of optical transport network 101, multiple signals transmitted at multiple channels may be combined into a single wide bandwidth optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may transmit disparate channels using WDM or some other suitable multi-channel multiplexing technique, and to amplify the multi-channel signal.

Recently, advancements in DWDM enabled combining several optical carriers to create a composite optical signal of a desired capacity. One such example of a multi-carrier optical signal is a superchannel, which is an example of high spectral efficiency (SE) that may attain transmission rates of 100 Gb/s, 400 Gb/s, 1 Tb/s, or higher. Thus, in a superchannel, subcarriers are tightly packed and consume less optical spectrum than in conventional DWDM. Another distinctive feature of superchannels is that the subcarriers in a superchannel travel from the same origin to the same destination, and are not added or removed using an OADM while in transmission. Techniques for achieving high spectral efficiency (SE) in optical networks may include the use of superchannels modulated using dual-polarization quadrature phase-shift keying (DP-QPSK) for long-haul transmission at data rates of 100 Gb/s or greater. In particular embodiments, Nyquist wavelength-division multiplexing (N-WDM) may be used in a superchannel. In N-WDM, optical pulses having a nearly rectangular spectrum are packed together in the frequency domain with a bandwidth approaching the baud rate.

Optical transport network 101 may include one or more optical transmitters (Tx) 102 to transmit optical signals through optical transport network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical transport network 101. In some embodiments, optical transmitter 102 may be used to determine the baud rate for the data to be transmitted during the optical modulation. An example of transmitter 102 for applying different baud rates is an adaptive rate transponder. An example of transmitter 102 for applying different modulation formats is a universally programmable transceiver. Additionally, a forward error correction (FEC) module may be included in optical transmitter 102, or may be used in conjunction with optical transmitter 102. The FEC module may process the electrical signal carrying the information or data to be transmitted to include error correction codes. The FEC module at transmitter 102 may also determine a baud rate for sending the data to be transmitted to optical transmitter 102 for optical modulation.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before and after certain lengths of fiber 106, which is referred to as "in-line amplification". Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA). However, any other suitable amplifier, such as a semiconductor optical amplifier (SOA), may be used.

OADMs 110 may be coupled to optical transport network 101 via fibers 106. OADMs 110 comprise an add/drop module, which may include a system, apparatus or device to add and drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination. In this manner, OADMs 110 may enable connection of different optical transport network topologies together, such as different rings and different linear spans.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown in FIG. 1) that may be included in a ROADM.

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing, which is compatible with conventional implementations of optical add-drop multiplexers (OADMs) and with conventional implementations of de-multiplexers 105. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, optical transport network 101 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in optical transport network 101, ROADM 110 may be capable of adding or dropping individual or multiple wavelengths of a WDM, DWDM, or superchannel signal carrying data channels to be added or dropped in the optical domain. In certain embodiments, ROADM 110 may include or be coupled to a wavelength selective switch (WSS).

As shown in FIG. 1, optical transport network 101 may also include one or more de-multiplexers 105 at one or more destinations of network 101. De-multiplexer 105 may comprise a system apparatus or device that acts as a de-multiplexer by splitting a single composite WDM signal into individual channels at respective wavelengths. For example, optical transport network 101 may transmit and carry a forty (40) channel DWDM signal. De-multiplexer 105 may divide the single, forty channel DWDM signal into forty separate signals according to the forty different channels. It will be understood that different numbers of channels or subcarriers may be transmitted and de-multiplexed in optical transport network 101, in various embodiments.

In FIG. 1, optical transport network 101 may also include receivers 112 coupled to de-multiplexer 105. Each receiver 112 may receive optical signals transmitted at a particular wavelength or channel, and may process the optical signals to obtain (demodulate) the information (data) that the optical signals contain. Accordingly, network 101 may include at least one receiver 112 for every channel of the network. As shown, receivers 112 may demodulate the optical signals according to a baud rate used by transmitter 102. In some embodiments, receiver 112 may include, or may be followed by, a forward error correction (FEC) module to use the error correction codes to check the integrity of the received data. The FEC module may also correct certain errors in the data based on the error correction codes. The FEC module at receiver 112 may also demodulate the data at a specific baud rate defined for each channel at transmitter 102, as described above.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "M-QAM."

Examples of PSK and QAM with a different number of symbols can include binary PSK (BPSK or 2-PSK) using two phases at 0° and 180° (or in radians, 0 and $\pi$) on the constellation diagram; or quadrature PSK (QPSK, 4-PSK, or 4-QAM) using four phases at 0°, 90°, 180°, and 270° (or in radians, 0, π/2, π, and 3π/2). Phases in such signals may be offset. Each of 2-PSK and 4-PSK signals may be arranged on the constellation diagram. Certain m-PSK signals may also be polarized using techniques such as dual-polarization QPSK (DP-QPSK), wherein separate m-PSK signals are multiplexed by orthogonally polarizing the signals. Also, M-QAM signals may be polarized using techniques such as dual-polarization 16-QAM (DP-16-QAM), wherein separate M-QAM signals are multiplexed by orthogonally polarizing the signals.

Dual polarization technology, which may also be referred to as polarization division multiplexing (PDM), enables achieving a greater bit rate for information transmission. PDM transmission comprises simultaneously modulating information onto various polarization components of an optical signal associated with a channel, thereby nominally increasing the transmission rate by a factor of the number of polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In certain embodiments, optical transport network 101 may transmit a superchannel, in which a plurality of subcarriers (or subchannels or channels) are densely packed in a fixed bandwidth band and may be transmitted at very high data rates, such as 400 Gb/s, 1 Tb/s, or higher. Furthermore, the superchannel may be well suited for transmission over very long distances, such as hundreds of kilometers, for example. A typical superchannel may comprise a set of subcarriers that are frequency multiplexed to form a single channel that are transmitted through optical transport network 101 as one entity. The subcarriers within the superchannel may be tightly packed to achieve high spectral efficiency.

In an optical network, such as optical transport network 101 in FIG. 1, it is typical to refer to a management plane, a control plane, and a transport plane (sometimes called the physical layer). A central management host (see also FIG. 3) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, or an operational support system (OSS) which handles network-wide operations.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

In operation, optical transport network 101 represents a certain transmission capacity for data. As the demand for transmission capacity continues to increase, various methods may be employed to accommodate greater transmission capacity on optical transport network 101. For example, advanced modulation formats, such as 16-QAM or 64-QAM, may be used to increase transmission capacity per wavelength channel. The advanced modulation formats may be applied using transmitter 102 and receiver 112. However, the use of higher order modulation formats may result in decreased transmission reach (also referred to simply as 'reach') of the optical signal. For example, the reach may be determined by an acceptable value for bit error rate (BER), and accordingly OSNR, which may be observed at receivers 112.

Another strategy for increasing transmission capacity is the use of a superchannel, in which multiple subcarrier signals are densely packed in a fixed bandwidth band and may be transmitted at very high data rates, such as 400 Gb/s, 1 Tb/s, or higher. As noted above, optical superchannels may represent a promising solution for transmission of signals at 400 Gb/s and 1 Tb/s data rate per channel. However, as noted above, superchannels are typically used with flexible grid network components, which may not be universally available. Also, administration of superchannels may be associated with additional layers of network management, which may be undesirable in certain networks. While the use of superchannels typically enables an increase in transmission capacity, superchannels typically do not extend the transmission reach of optical signals using optical transport network 101.

In operation of optical transport network 101, in order to extend the transmission reach of certain optical signals, such as high capacity optical signals modulated using an advanced modulation format, constellation shaping may be applied to the optical signals. In constellation shaping, data bits are mapped and coded into improved constellations that may exhibit improved noise tolerance or increased OSNR. As a result of the improved noise tolerance, the reach of an optical signal in which constellation shaping has been applied may be increased, which is desirable for optical communication using optical transport network 101. In a typical modulation format (such as QPSK or M-QAM), the symbols exhibit a uniform distribution in the complex plane, shown as uniformly distribution constellation points in a constellation diagram. When constellation shaping is applied to a modulation formation, the distribution of the symbols in the complex plane is changed to provide an improved mapping for noise tolerance. In some instances, the distribution of symbols may be a Gaussian or Gaussian-like distribution that is shown as non-uniform constellation points in the constellation diagram (see also FIG. 2B).

As noted above, transmitter 102 may be a universally programmable transceiver for applying different modulation formats, while receiver 112 may include the corresponding functionality for demodulation. Thus, transmitter 102 may support the use of constellation shaping and may be selectively programmed to apply constellation shaping on a per channel basis, while receiver 112 may correspondingly demodulate channels to which a certain kind of constellation shaping has been applied. In various embodiments, transmitter 102 and receiver 112 may include respective mapping/de-mapping functionality, such as within a digital signal processing (DSP) module, to enable implementation of constellation shaping in optical transport network 101.

In one example, constellation shaping may involve superposition mapping, as described in Equation 1.

$$y = y_I + jy_Q = \sum_{n=1}^{N} e^{j\pi b_n} h_n \qquad \text{Equation (1)}$$

In Equation 1:

y is the optical signal comprised of modulated symbols;

$y_I$ and $y_Q$ are the in-phase (real) and quadrature (imaginary) quadrature components;

N is the number of bits per symbol;

$b_n$ are the encoded binary bits; and $h_n$ represents a weighted symbol mapping scheme, given by $h_n = \alpha_n e^{j\Theta_n}$, where $\alpha_n$ is $\alpha_n$ amplitude power factor and $\Theta_n$ is a phase power factor.

In this example, $h_n$ allocates a certain amplitude and phase to each symbol. By tuning the amplitude power factor an and the phase power factor $\Theta_n$, different superposition mapping schemes can be implemented. For example, in superposition coded mapping using phase-shifted modulation (PSM), the amplitude power factor $\alpha_n$ is kept constant and the phase power factor $\Theta_n$ is uniformly distributed in the complex plane. Additionally, different encoding schemes may be applied prior to superposition mapping, such as superposition coded mapping using bit-interleaved coded modulation. It is noted that when superposition mapping is used in a non-bijective (many-to-one) mapping, decoding and de-mapping at the receiver may involve iterative operations.

Other constellation shaping techniques include iterative polar modulation (IPM) and low-density parity check (LPDC) coded modulation with probabilistic shaping. Probabilistic shaping (PS) based on M-QAM has been studied as a way to control spectral efficiency with finer granularity and to achieve an improved performance closer to Shannon capacity limit. In one example, PS-M-QAM may be implemented using constant composition distribution matching (CCDM). Performing probabilistic shaping based on M-QAM may improve utilization of network resource. In some cases, the shaped profile follows a Maxwell-Boltzmann distribution. Using existing methods, the minimum entropy of probabilistic shaping based on M-QAM is 2 bits/symbol, which corresponds to QPSK, where entropy, as a measure of information, is defined as the number of bits of information contained in each message or symbol, where channel noise is not considered.

In optical transport network 101, constellation shaping may be activated/deactivated as a procedure in network operations on a per channel basis for a given optical path. In this manner, the available spectrum may be flexibly allocated in terms of bandwidth and constellation shaping to meet various traffic demands, based on specific path information (distance, number/type of co-propagating channels, fiber type, and dispersion map), which may be economically desirable. Furthermore, constellation shaping using universal programmable transceivers in optical transport network 101 may provide improvements in reach with the same electronics and optical components that are already available and installed, which may enable a rapid upgrade to implement constellation shaping.

As noted above, entropy may be defined as the number of bits of information contained in each message or symbol. Entropy may be calculated using the following equation:

$$H(X) = -\Sigma_i P(x_i) \log_2 P(x_i) \qquad \text{Equation (2)}$$

In Equation 2, X is a discrete random variable with M possible symbols $\{x_1, x_2, \ldots x_M\}$, and P(X) is a probability mass function representing the probability of each symbol assigned. For a uniform distribution, Equation 2 becomes:

$$H(X) = -\sum_{i=1}^{M} \frac{1}{M} \log_2 \frac{1}{M} \qquad \text{Equation (3) or}$$

$$\log_2 M = m(\text{bits/symbol}) \qquad \text{Equation (4)}$$

Figures 2A, 2B:
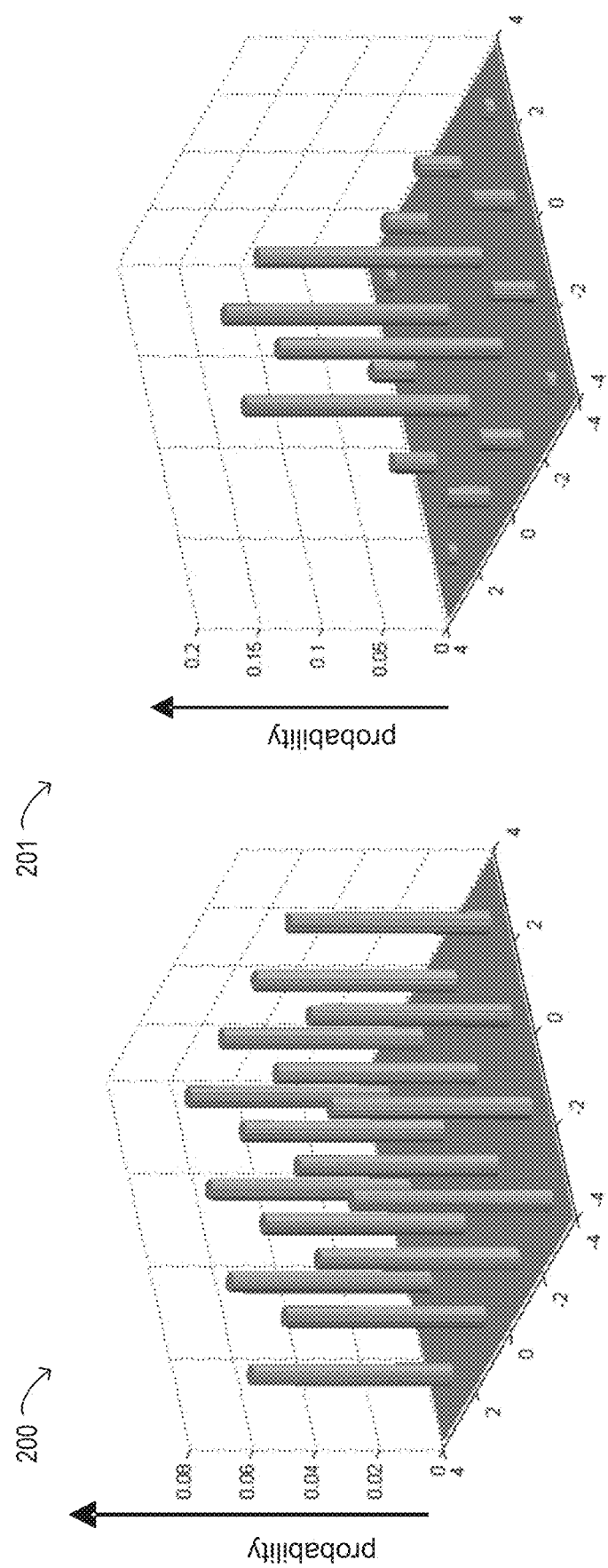
FIG. 2A illustrates selected elements of an embodiment of a probability distribution diagram for constellation points in a uniformly shaped 16-QAM constellation.
FIG. 2B illustrates selected elements of an embodiment of a probability distribution diagram for constellation points in a probabilistically shaped 16-QAM constellation.

FIG. 2A illustrates selected elements of an embodiment of a uniform probability distribution diagram 200 corresponding to a constellation diagram in the complex plane for 16-QAM. In this example, for 16-QAM with a uniform distribution, there would be 16 different symbols, each having a probability of 1/16. The height of each column represents a probability value for a symbol in a corresponding position in constellation diagram 200. In this example, the probability of each symbol assigned is 1/16 or 0.0625. Plugging the probability P=1/16 into Equation 2 above, plugging M=16 into Equation 3 above, or plugging M=16 into Equation 4, as shown below, yields an entropy of four bits per symbol.

$$\log_2 16 = 4 \text{ (bits/symbol)}$$

Referring now to FIG. 2B, selected elements of an embodiment of a probability distribution diagram 201 for constellation points in a probabilistically shaped 16-QAM constellation are shown. In probability distribution diagram 201, the probabilistically shaped 16-QAM constellation is shown having a non-uniform probability distribution of constellation points as an example of constellation shaping, as disclosed herein. The height of each column represents a probability value for a symbol in a corresponding position in a constellation diagram for 16-QAM.

As illustrated in FIG. 2B, probabilistic shaping is circularly symmetric, with the probability being dependent on the energy of the symbol. For example, all symbols at a same first distance from the center of the constellation have the same probability. In the illustrated example, probabilistic shaping has been applied to the 16-QAM constellation to boost the relative probability of the four innermost symbols (when compared to a uniform distribution), and to decrease the probability of the other symbols. As a result of the shaping, eight symbols at a same second distance from the center of the constellation have the same energy and corresponding probability as each other, both of which are smaller than those of the four innermost symbols. The four outermost symbols at a same third distance from the center of the constellation (shown in FIG. 2B as the corner symbols in probability distribution diagram 201) have the same energy and corresponding probability as each other, and that probability is the smallest of those for the symbols in the constellation.

In an extreme case of probabilistic shaping for 16-QAM, the innermost four symbols might each have a probability of 0.25, and all other symbols might have a probability of zero. This extreme case represents the lowest possible entropy of 2 bits/symbol, which corresponds to a QPSK modulation format. In this case, as shown in the equations for calculating entropy above, the number of bits/symbol is smaller than that of uniform 16-QAM. Note, however, that in the example illustrated in FIG. 2B, none of the symbols has a probability of zero. Therefore, the lowest possible entropy of 2 bits/symbol will not be achieved, in this example. Note that by controlling the probability, the actual data rate for transmitting the information encoded in an optical signal may also be controlled.

As will be described in further detail herein, methods and systems are disclosed for error correction in optical transport networks, such as optical transport network 101, that implement both probabilistic shaping and symbol rate optimization. In these networks, a single systematic error correction encoder may be configured to add parity bits collectively across respective shaped bit sequences associated with different subcarrier channels.

Figure 3:
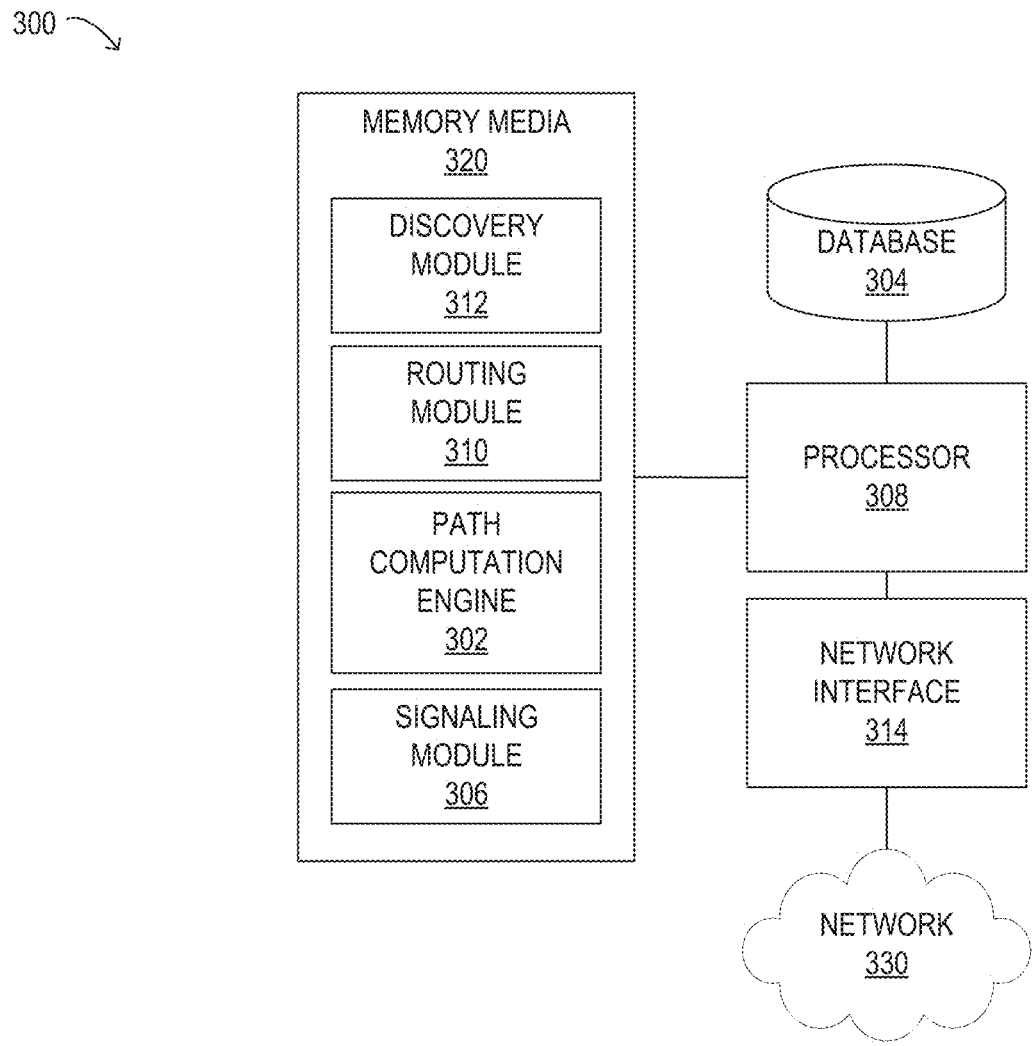
FIG. 3 is a block diagram of selected elements of an embodiment of network management system for implementing control plane functionality in optical networks.

Referring now to FIG. 3, a block diagram of selected elements of an embodiment of network management system 300 for implementing control plane functionality in optical networks, such as, for example, in optical transport network 101 (see FIG. 1), is illustrated. A control plane may include functionality for network intelligence and control and may comprise applications that support the ability to establish network services, including applications or modules for discovery, routing, path computation, and signaling, as will be described in further detail. The control plane applications executed by network management system 300 may work together to automatically establish services within the optical network. Discovery module 312 may discover local links connecting to neighbors. Routing module 310 may broadcast local link information to optical network nodes while populating database 304. When a request for service from the optical network is received, path computation engine 302 may be called to compute a network path using database 304. This network path may then be provided to signaling module 306 to establish the requested service.

As shown in FIG. 3, network management system 300 includes processor 308 and memory media 320, which may store executable instructions (i.e., executable code) that may be executable by processor 308, which has access to memory media 320. Processor 308 may execute instructions that cause network management system 300 to perform the functions and operations described herein. For the purposes of this disclosure, memory media 320 may include non-transitory computer-readable media that stores data and instructions for at least a period of time. Memory media 320 may comprise persistent and volatile media, fixed and removable media, and magnetic and semiconductor media. Memory media 320 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 320 is operable to store instructions, data, or both. Memory media 320 as shown includes sets or sequences of instructions that may represent executable computer programs, namely, path computation engine 302, signaling module 306, discovery module 312 and routing module 310.

Also shown included with network management system 300 in FIG. 3 is network interface 314, which may be a suitable system, apparatus, or device operable to serve as an interface between processor 308 and network 330. Network interface 314 may enable network management system 300 to communicate over network 330 using a suitable transmission protocol or standard. In some embodiments, network interface 314 may be communicatively coupled via network 330 to a network storage resource. In some embodiments, network 330 represents at least certain portions of optical transport network 101. In certain embodiments, network 330 may include at least certain portions of a public network, such as the Internet. Network 330 may be implemented using hardware, software, or various combinations thereof.

In certain embodiments, the control plane may be configured to interface with a person (i.e., a user) and receive data about the signal transmission path. For example, the control plane may also include and/or may be coupled to one or more input devices or output devices to facilitate receiving data about the signal transmission path from the user and outputting results to the user. The one or more input and output devices (not shown in FIG. 3) may include, but are not limited to, a keyboard, a mouse, a touchpad, a microphone, a display, a touchscreen display, an audio speaker, or the like. Alternately or additionally, the control plane may be configured to receive data about the signal transmission path from a device such as another computing device or a network element (not shown in FIG. 3), for example via network 330.

As shown in FIG. 3, in some embodiments, discovery module 312 may be configured to receive data concerning an optical signal transmission path in an optical network and may be responsible for discovery of neighbors and links between neighbors. In other words, discovery module 312 may send discovery messages according to a discovery protocol, and may receive data about the optical signal transmission path. In some embodiments, discovery module 312 may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others.

As shown in FIG. 3, routing module 310 may be responsible for propagating link connectivity information to various nodes within an optical network, such as optical transport network 101. In particular embodiments, routing module 310 may populate database 304 with resource information to support traffic engineering, which may include link bandwidth availability. Accordingly, database 304 may be populated by routing module 310 with information usable to determine a network topology of an optical network.

Path computation engine 302 may be configured to use the information provided by routing module 310 to database 304 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 302 may consider the interplay between the transmission degradation factors. In various embodiments, path computation engine 302 may generate values for specific transmission degradation factors. Path computation engine 302 may further store data describing the optical signal transmission path in database 304.

In FIG. 3, signaling module 306 may provide functionality associated with setting up, modifying, and tearing down end-to-end networks services in optical transport network 101. For example, when an ingress node in the optical network receives a service request, the control plane may employ signaling module 306 to request a network path from path computation engine 302 that may be optimized according to different criteria, such as bandwidth, cost, etc. When the desired network path is identified, signaling module 306 may then communicate with respective nodes along the network path to establish the requested network services. In different embodiments, signaling module 306 may employ a signaling protocol to propagate subsequent communication to and from nodes along the network path.

In operation of network management system 300, path computation engine 302, or another entity or module, may provide path information associated with a given optical path, such as a distance, a number and type of optical channels to be transmitted, a fiber type, and a dispersion map. For example, signaling module 306, or another entity or module, may receive the path information and may decide on a type of modulation format and whether or not to use constellation shaping and/or subcarrier multiplexing for any of the optical channels transmitted over the optical path. In order to activate or deactivate constellation shaping, signaling module 306 may send a first command to each transmitter for each of the optical channels, respectively. Then, signaling module 306 may send a second command to each receiver corresponding to each transmitter to activate or deactivate constellation shaping. Transmitters and receivers having universal programmable transponder functionality may receive the commands from signaling module 306 and may then activate or deactivate transmission of the optical channels using constellation shaping. Similarly, in order to activate or deactivate symbol rate optimization using subcarrier multiplexing, signaling module 306 may send a first command to each transmitter for each of the optical channels, respectively. Then, signaling module 306 may send a second command to each receiver corresponding to each transmitter to activate or deactivate symbol rate optimization using subcarrier multiplexing. Transmitters and receivers having universal programmable transponder functionality may receive the commands from signaling module 306 and may then activate or deactivate transmission of the optical channels using subcarrier multiplexing. In at least some embodiments, the optical transport networks described herein may be configured to implement both constellation shaping and symbol rate optimization using subcarrier multiplexing for the same optical channels.

Figure 4:
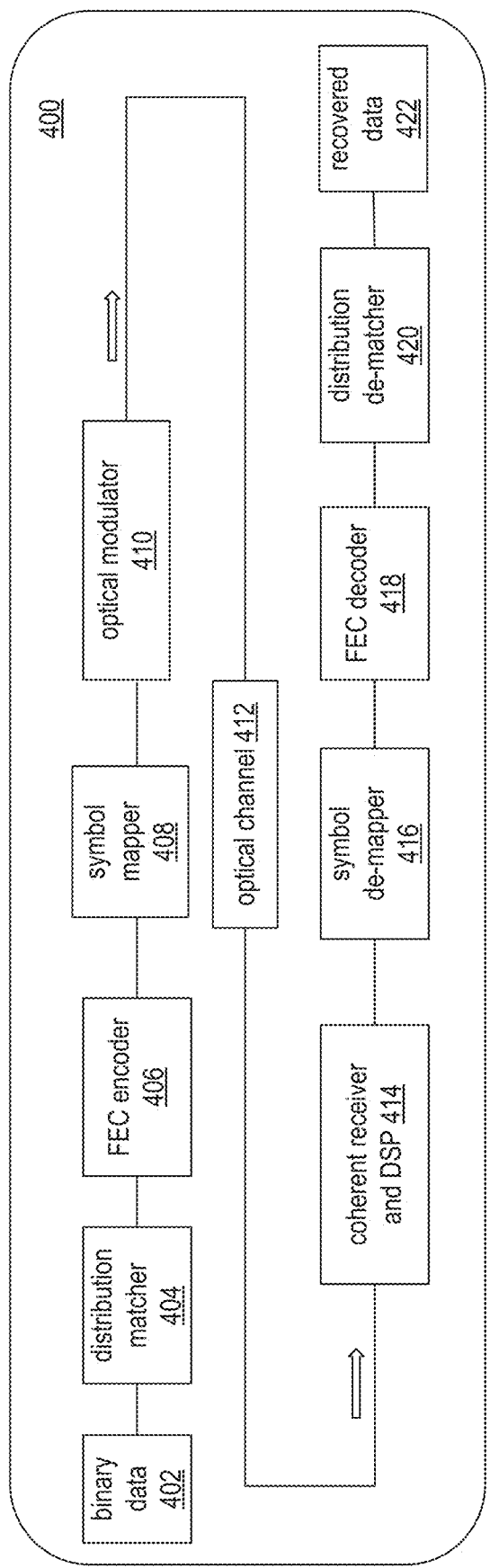
FIG. 4 is a schematic diagram illustrating selected elements of an example embodiment of an optical transmission system configured to apply symbol-level probabilistic shaping to one or more WDM channels in an optical network.

FIG. 4 is a schematic diagram illustrating selected elements of an example optical transmission system 400 configured to apply symbol-level probabilistic shaping to one or more WDM channels in an optical network. In the illustrated example, transmission system 400 includes elements similar to those of a conventional transmitter/receiver including, on the transmitter side, binary data 402 that is provided to optical transmission system 400 for transmission, forward error correction (FEC) encoder 406, symbol mapper 408, and optical modulator 410, an optical channel 412 comprising a suitable transmission media, and, on the receiver side, coherent receiver and DSP element 414, symbol de-mapper 416, and FEC decoder 418. In some embodiments, FEC encoder 406 may be a systematic error correction encoder.

In order to apply probabilistic shaping, transmission system 400 also includes distribution matcher 404 on the transmitter side and distribution de-matcher 420 on the receiver side. The matcher may ensure sure that the center constellation points have a higher probability of occurrence than the edge constellation points. For example, distribution matcher 404 may be configured to control the probability of occurrence of certain constellation points on the transmitter side to shape the distribution of the constellation points, and distribution de-matcher 420 may be configured to reverse the probabilistic shaping process.

In optical transmission system 400, distribution matcher 404 receives the binary data 402 and generates data that is modified to achieve a particular probability profile based, for example, on a target probability distribution. Following distribution matcher 404, FEC encoder 406 and symbol mapper 408 may add forward error correcting encodings and map portions of binary data 402 (now with probabilities shaped by distribution matcher 404) to respective symbols before providing outputs to optical modulator 410 for transmission over optical channel 412. In the illustrated example, coherent receiver and DSP 414 may, using de-mapper 414, retrieve the modified and mapped portions of binary data 402 that were provided to optical modulator 410 and transmitted over optical channel 412. Subsequently, this binary data may be processed by FEC decoder 418 and distribution de-matcher 420 to recover the originally received binary data, shown as recovered data 422.

In optical transmission system 400, coherent receiver and DSP element 414 may include any or all of an I/Q imbalance compensation element, a chromatic dispersion compensation element, an adaptive equalizer, a polarization de-multiplexer, a frequency offset compensation element, a carrier phase recovery element, and/or a cycle slip compensation element.

In one example, probabilistic constellation shaping may be applied in a transponder configured to transmit an optical signal using 64-QAM. By apply probabilistic shaping, the spectral efficiency can vary from 64-QAM to QPSK (e.g., from 6 bits per symbol per polarization to 2 bits per symbol per polarization) with very fine tuning. In some embodiments, the spectral efficiency may be varied in increments of less than one bit per symbol. For example, instead of the spectral efficiency being configurable with values of just 6 or 5 bits per symbol, the spectral efficiency may be configurable with values of 5.1, 5.5, or 5.9 bits per symbol, as an example. In some embodiments, using distribution matcher 404 and distribution de-matcher 420, one transponder may be able to cover the whole range of spectral efficiency between 2 bits per symbol and 6 bits per symbol.

While probabilistic shaping is becoming popular due to the potential for SNR performance gains and the ability to fine tune the spectral efficiency through shaping, this approach has been found to incur larger nonlinear transmission penalties compared to uniform QAM. It has been discovered that there is an optimum symbol rate that, using subcarrier multiplexing, minimizes nonlinear penalties in fiber transmission systems and that this optimum symbol rate is dependent on the characteristics of the transmission fiber used and the transmission distance. In at least some embodiments, to improve transmission performance, subcarrier modulation may be utilized along with probabilistic shaping. In one example, a probabilistically shaped signal that has a baud rate of 64 GBaud may be divided across four subcarriers. In this example, the baud rate for each subcarrier may be on the order of 16 GBaud.

The nonlinear interactions between subcarriers of a multi-carrier channel may include phenomena such as cross-phase modulation (XPM), self-phase modulation (SPM), and four-wave mixing, among others. Cross-phase modulation may occur when phase information, amplitude information, or both from one subcarrier is modulated to an adjacent subcarrier in the multi-carrier channel. Self-phase modulation may arise when a variation in the refractive index (or a dependency of the refractive index on intensity) results in a phase shift within each subcarrier. In four-wave mixing (FWM), three wavelengths may interact to create a fourth wavelength that may coincide with a wavelength of a subcarrier and may lead to undesirable variations in peak power or other types of signal distortion on the affected subcarrier. Furthermore, nonlinear cross-talk may comprise inter-subcarrier components. Since nonlinear interactions occur during fiber transmission and may not depend on a degree of overlap of the subcarrier frequency bands, Nyquist pulse shaping may be ineffective in resolving certain problems with nonlinear cross-talk in a multi-carrier channel. In some embodiments, by sub-dividing a single high symbol rate channel into multiple low symbol rate subcarriers, the impact of SPM and/or XPM may be significantly reduced. However, FWM may increase as the number of subcarriers increases. Thus, an optimum number of subcarriers, and a corresponding optimum symbol rate, may exist such that the total penalty due to fiber nonlinearity is minimized, which may enable increased transmission reach.

Figure 5:
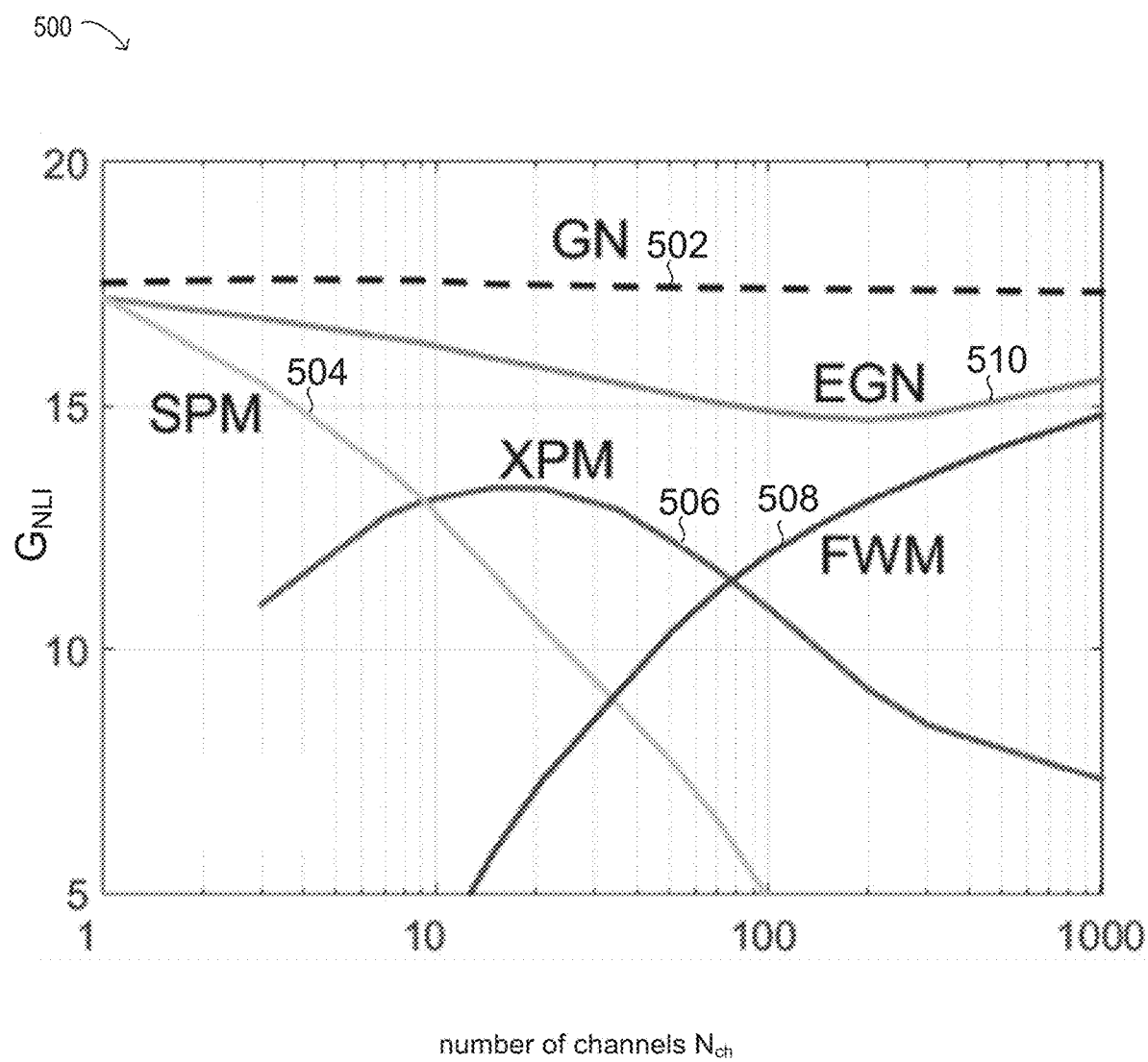
FIG. 5 illustrates relationships between nonlinear penalties, transmission fiber characteristics, and optimum symbol rates.

FIG. 5 illustrates relationships between nonlinear penalties, transmission fiber characteristics, and optimum symbol rates for a particular fiber type. More specifically, FIG. 5 depicts an example graph 500 plotting non-linear interference $G_{NLI}$ vs. the number of channels $N_{ch}$ for a standard Single-Mode Fiber (SMF). More specifically, the x-axis indicates the number of channels in a given signal band, while the y-axis indicates the coefficients of various non-linearity measurements as the number of channels increases.

In the example graph 500 shown in FIG. 5, flattened curve 502 (GN) represents a Gaussian noise model. The GN model, in which the same nonlinear interference is assumed regardless of the number of subcarrier channels for simplicity, cannot predict the impact of subcarrier multiplexing on nonlinearity accurately enough to be particularly useful, on its own, in performing symbol rate optimization. In graph 500, curve 504 (SPM) represents self-phase modulation effects, curve 506 (XPM) represents cross-phase modulation effects, and curve 508 (FWM) represents four-way mixing effects, all of which contribute to nonlinear interference. In this example, curve 510 (EGN) represents an enhanced Gaussian noise model that, in some embodiments, may be used to estimate nonlinear interference in a particular subcarrier channel. More specifically, the EGN model is an aggregate of the SPM, XPM, and FWM models, representing the overall nonlinear interference penalty as the number of subcarrier channels increases. This aggregate model has been shown to be more accurate than a GN model alone, making it more suitable for use in performing symbol rate optimization. Using the EGN model, nonlinear interference may be minimized with a particular number of subcarrier channels in a given bandwidth, which may correspond to an optimum symbol rate for a given baud rate, such as for 64 GBaud. For example, the aggregate nonlinear interference may be calculated and plotted using the EGN model, after which a minimum nonlinear interference penalty may be identified as the point at which the EGN curve 510 dips down to its lowest point with respect to the y-axis. The point at which the EGN curve 510 dips down to its lowest point may correspond to the optimum number of subcarrier channels, as shown on the x-axis.

Preliminary studies have shown that, as the number of subcarriers is increased, the fiber input power may also be increased, thus improving the nonlinear transmission performance. In addition, it has been shown that, if the entropy is decreased and stronger shaping is introduced, the gain achieved when utilizing the optimum number of subcarriers will increase. Studies have also shown that performance at the center subcarriers may be worse than at outer subcarriers due to the increase in cross-phase modulation effects from neighboring channels.

Probabilistic shaping along with symbol rate optimization has been shown to provide an increase in SNR performance gains and minimal nonlinear transmission penalties. In other words, the introduction of symbol rate optimization (SRO) can improve the transmission performance of probabilistically shaped signals. Approaches to implementing both probabilistic shaping and symbol rate optimization in which each subcarrier is associated with a different shaping factor, a different net data rate, and/or a different error correction rate may be prohibitively complex to implement. In at least some embodiments, the optical transmission systems described herein may implement both probabilistic shaping and symbol rate optimization using subcarrier multiplexing using an error correction technique that does not perform FEC encoding on each subcarrier but instead utilizes a systematic error correction encoder to apply error correction across the bit streams from all subcarriers to average out the performance of the subcarrier channels. As described in more detail below, these systems may include an optical transmitter having one or more matcher elements, each configured to assign respective probabilities to symbols represented in received binary data dependent on a target probability distribution and to output a respective shaped bit sequence, and a single systematic error correction encoder configured to add parity bits collectively across the shaped bit sequences and to output a combined shaped bit sequence including data representing the shaped bit sequences and the added parity bits.

Figure 6A:
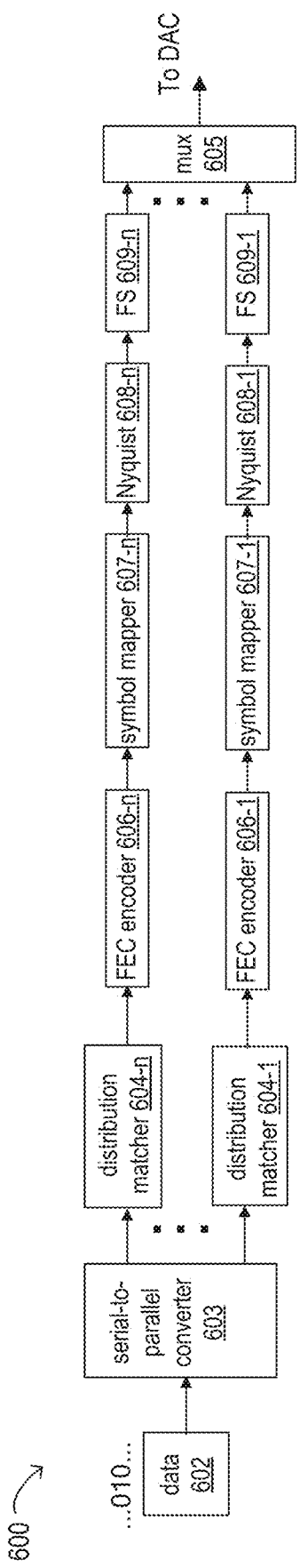
FIG. 6A is a schematic diagram illustrating selected elements of a transmitter portion of an example optical transmission system configured to apply probabilistic constellation shaping and symbol rate optimization, according to some embodiments.

FIG. 6A is a schematic diagram illustrating selected elements of a transmitter portion 600 of an example optical transmission system configured to apply probabilistic constellation shaping and symbol rate optimization using subcarrier multiplexing, according to some embodiments. For example, transmitter portion 600 may be configured to perform probabilistic shaping based on M-QAM, in addition to performing symbol rate optimization using subcarrier multiplexing. In the illustrated embodiment, at least some of the elements of the transmitter portion 600 of the optical transmission system are similar to elements of the transmitter portion of optical transmission system 400 illustrated in FIG. 4 and described above. The depiction of transmitter portion 600 is a schematic representation and is not drawn to scale. In various embodiments, transmitter portion 600 may be implemented with more, fewer, or different elements than those depicted in FIG. 6A. In some embodiments, transmitter portion 600 may include a field-programmable gate array (FPGA) for performing at least some of the functionality described herein. In some embodiments, transmitter portion 600 may include a digital signal processor (DSP), which may include (or have access to) a memory storing instructions executable by the DSP for performing at least some of the functionality described herein. In the illustrated embodiment, the transmitter portion 600 includes binary data 602 that is provided for transmission to a receiver portion of the optical transmission system. In at least some embodiments, transmitter portion 600 illustrated in FIG. 6A may represent one of two transmitter portions of the optical transmission system, each of which is configured to generate the real (I) portion or imaginary (Q) portion of the data 602 for optical modulation that is converted to analog signals by a respective digital to analog converter (DAC).

A single serial-to-parallel converter 603 splits the incoming binary data 602 into n streams, each directed to a respective processing path for processing in parallel. In at least some embodiments, there is a one-to-one mapping between the n parallel processing paths and n subcarrier channels over which information represented in binary data 602 is carried from the transmitter portion 600 to the receiver portion. In the illustrated embodiment, transmitter portion 600 includes multiple distribution matchers 604, including one for each of the parallel streams generated by serial-to-parallel converter 603, multiple FEC encoders 606, including one for each of the parallel streams, multiple symbol mappers 607, including one for each of the parallel streams, multiple Nyquist filtering elements 608, including one for each of the parallel streams, and multiple frequency shifting elements 609, including one for each of the parallel streams. As illustrated in FIG. 6A, in at least some embodiments, for each subcarrier 1 to n, transmitter portion 600 may perform symbol mapping and Nyquist filtering before frequency shifting (FS) is applied. In the illustrated embodiment, the outputs of the multiple processing paths, each of which includes binary data representing various codewords, are combined by a single subcarrier multiplexer 605 for transmission to the optical receiver over the optical transmission path using subcarrier multiplexing. For example, subcarrier multiplexer 605 may be configured to combine the individual subcarrier data output by the multiple processing paths into either the real (I) portion or the imaginary (Q) portion of the optical signal to be transmitted.

In this example, it may be assumed that all subcarrier channels have the same shaping factor and FEC rate (thus carrying the same net data rate) based on a common QAM modulation format implemented for all subcarrier channels. In the embodiment illustrated in FIG. 6A, there is one distribution matcher 604 per subcarrier. In at least some embodiments of the optical transmission systems described herein, a systematic FEC may be used, not to change the incoming bit patterns generated by the distribution matchers, but to add parity bits, in accordance with probabilistic amplitude shaping (PAS). By contrast, if FEC encoding is implemented on a per-subcarrier-channel basis, the required OSNR may be determined based on the worst subcarrier channel performance, since the nonlinear transmission penalties depend on the number of subcarrier channels.

Figure 6B:
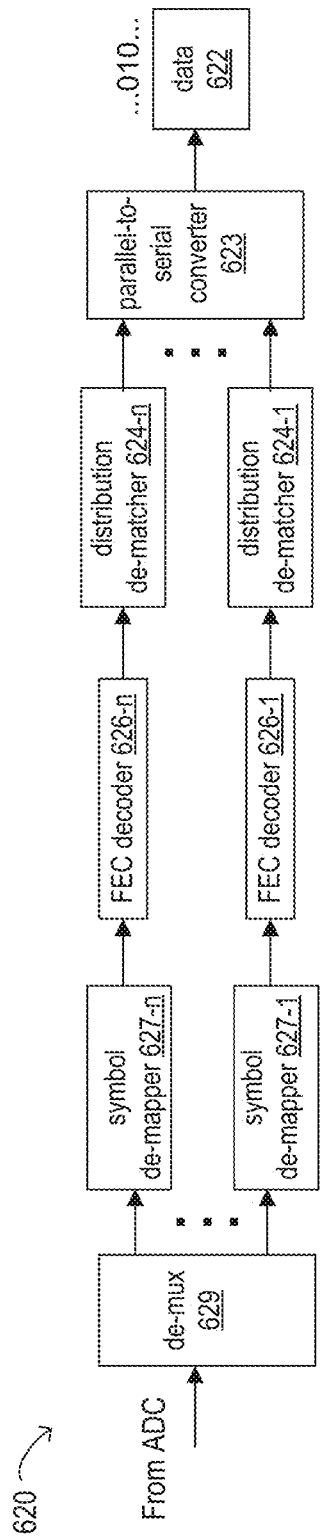
FIG. 6B is a schematic diagram illustrating selected elements of a receiver portion of an example optical transmission system configured to recover information from optical signals received from the transmitter portion depicted in FIG. 6A, according to some embodiments.

FIG. 6B is a schematic diagram illustrating selected elements of a receiver portion 620 of an example optical transmission system configured to recover information from optical signals received from the transmitter portion depicted in FIG. 6A, according to some embodiments. In the illustrated embodiment, at least some of the elements of the receiver portion 620 of the optical transmission system are similar to elements of the receiver portion of optical transmission system 400 illustrated in FIG. 4 and described above. The depiction of receiver portion 620 is a schematic representation and is not drawn to scale. In various embodiments, receiver portion 620 may be implemented with more, fewer, or different elements than those depicted in FIG. 6B. In some embodiments, receiver portion 620 may include a field-programmable gate array (FPGA) for performing at least some of the functionality described herein. In some embodiments, receiver portion 620 may include a digital signal processor (DSP), which may include (or have access to) a memory storing instructions executable by the DSP for performing at least some of the functionality described herein. In the illustrated embodiment, the receiver portion 620 receives, from an analog-to-digital converter, a digitized signal for a transmitted optical signal in a coherent optical receiver of the optical transmission system. In at least some embodiments, receiver portion 620 illustrated in FIG. 6B may represent one of two receiver portions of the optical transmission system, which are configured to receive binary data representing the real (I) portion and the imaginary (Q) portion of the optical signal received from the transmitter portion of the optical transmission system, respectively.

In the illustrated embodiment, the receiver portion 620 includes a single subcarrier de-multiplexer 629 that splits the incoming optical signal into n streams, each directed to a respective processing path for processing in parallel. In some embodiments, subcarrier de-multiplexer 629 may include an adaptive equalizer, a carrier phase recovery element, or other functional elements of an optical receiver (not shown in FIG. 6B). In at least some embodiments, there is a one-to-one mapping between the n parallel processing paths and n subcarrier channels over which information is received from the transmitter portion 600.

In the illustrated embodiment, receiver portion 620 includes multiple symbol de-mappers 627, including one for each of the parallel streams, multiple FEC decoders 626, including one for each stream, multiple distribution de-matchers 624, including one for each stream. A single parallel-to-serial converter 623 combines the outputs of the parallel processing paths to recover transmitted information as data 622. For example, parallel-to-serial converter 623 may be configured to combine the outputs of the parallel processing paths of receiver portion 620 to recover data representing either the real (I) portion or the imaginary (Q) portion of the received optical signal.

As noted above, if the optical transmission system illustrated in FIGS. 6A and 6B uses the same shaping factor and the same FEC rate for all of the subcarrier channels, the transmission performance of the subcarriers might be different, and the overall transmission performance of the system may be limited by the lowest performing channel. In at least some embodiments, the optical transmission systems described herein may apply a type of "FEC interleaving" between subcarriers to average out the performance of the subcarriers and improve the overall performance of the system. For example, a FEC encoder referred to as a "systematic FEC encoder" may apply systematic error correction encoding across the bit streams for all subcarriers generated by one or more distribution matchers to average out the performance of the subcarrier channels. The particular interleaving pattern applied by the systematic FEC encoder may be dependent on the performance of particular subcarrier channels, such that there is interleaving between the subcarrier channels having the worst performance and the subcarrier channels having best performance to effectively average out the overall performance of the subcarrier channels.

In at least some embodiments, the block size for inputs to FEC may be a multiple of (m−1) where m is the bit level in probabilistic amplitude shaping (PAS). For example, 64QAM may correspond to 8-PAS for both the I and Q channels, and to m=3 for both the I and Q channels, respectively, with a FEC rate c=(m−1)/m. As described in more detail in reference to FIG. 12B, for an arbitrary FEC rate, some of the incoming data bits may be used as sign bits. Systematic FEC may implemented for an incoming serial bit stream regardless of whether the transmitter portion of the optical transmission system includes one distribution matcher or multiple distribution matchers. In at least some embodiments, it may be assumed that the symbol distribution of the subcarrier channels follows the distribution after the distribution matcher(s), which should hold true if the input bit stream is random.

In at least some embodiments, the optical transmission systems described herein may assign probabilities symmetrically. In one example, probabilistic amplitude shaping may be performed by one more distribution matchers, with the amplitude of the probability labeled as 10, 11, 01, or 00, after which a parity checking bit added by a systematic FEC encoder determines the sign of the probability label as a highest order bit of the probability. In this example, the systematic FEC encoder does not change the probability amplitude represented by the two lowest order bits output by the distribution matchers. In some embodiments, the probability of each of the parity bits assigned by the systematic FEC having a value of '1' or a value of '0' is expected to be fifty percent for a random sequence of shaped bits. In this example, labels [011] and [111] represent the same probability, but with different signs.

Figure 7:
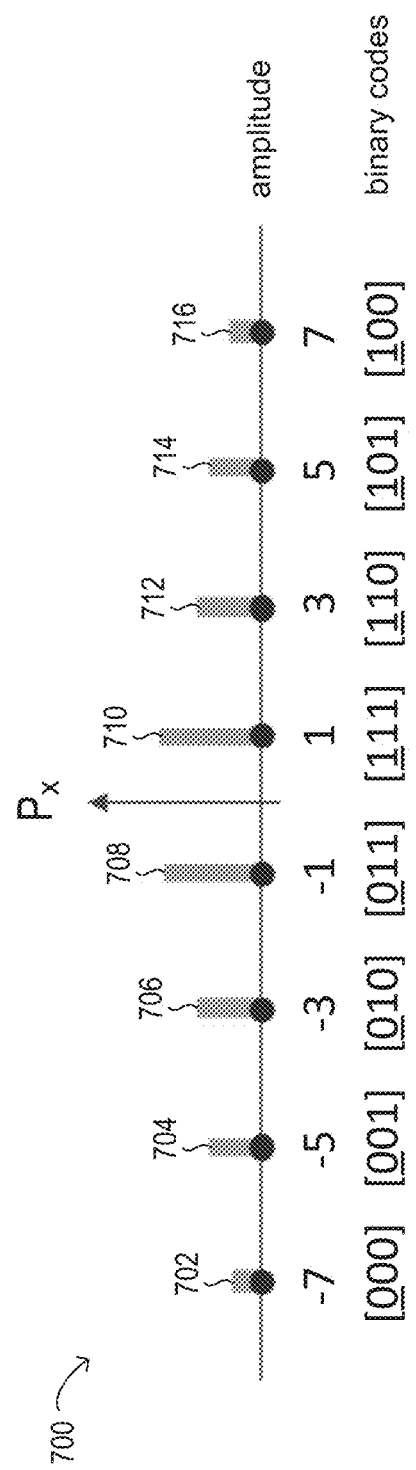
FIG. 7 illustrates an example symbol probability distribution for probabilistic amplitude shaping, according to some embodiments.

FIG. 7 illustrates an example symbol probability distribution 700 for probabilistic constellation shaping for 8-ASK. In this example, there are four possible amplitudes, which are represented by two least significant bits, while the most significant bits represent sign bits added by a FEC encoder of the transmitter. The height of each bar represents the probability of each amplitude, with the probability distribution being symmetric for sign bit values of '0' and '1'. For example, the height of bar 702 indicates the probability for a symbol −7, which is the same as the height of bar 716, which indicates the probability for a symbol +7. Similarly, the height of bar 704 indicates the probability for a symbol −5, the height of bar 714 indicates the probability for a symbol +5, the height of bar 706 indicates the probability for a symbol −3, the height of bar 712 indicates the probability for a symbol +3, the height of bar 708 indicates the probability for a symbol −1, and the height of bar 710 indicates the probability for a symbol +1.

Figure 8:
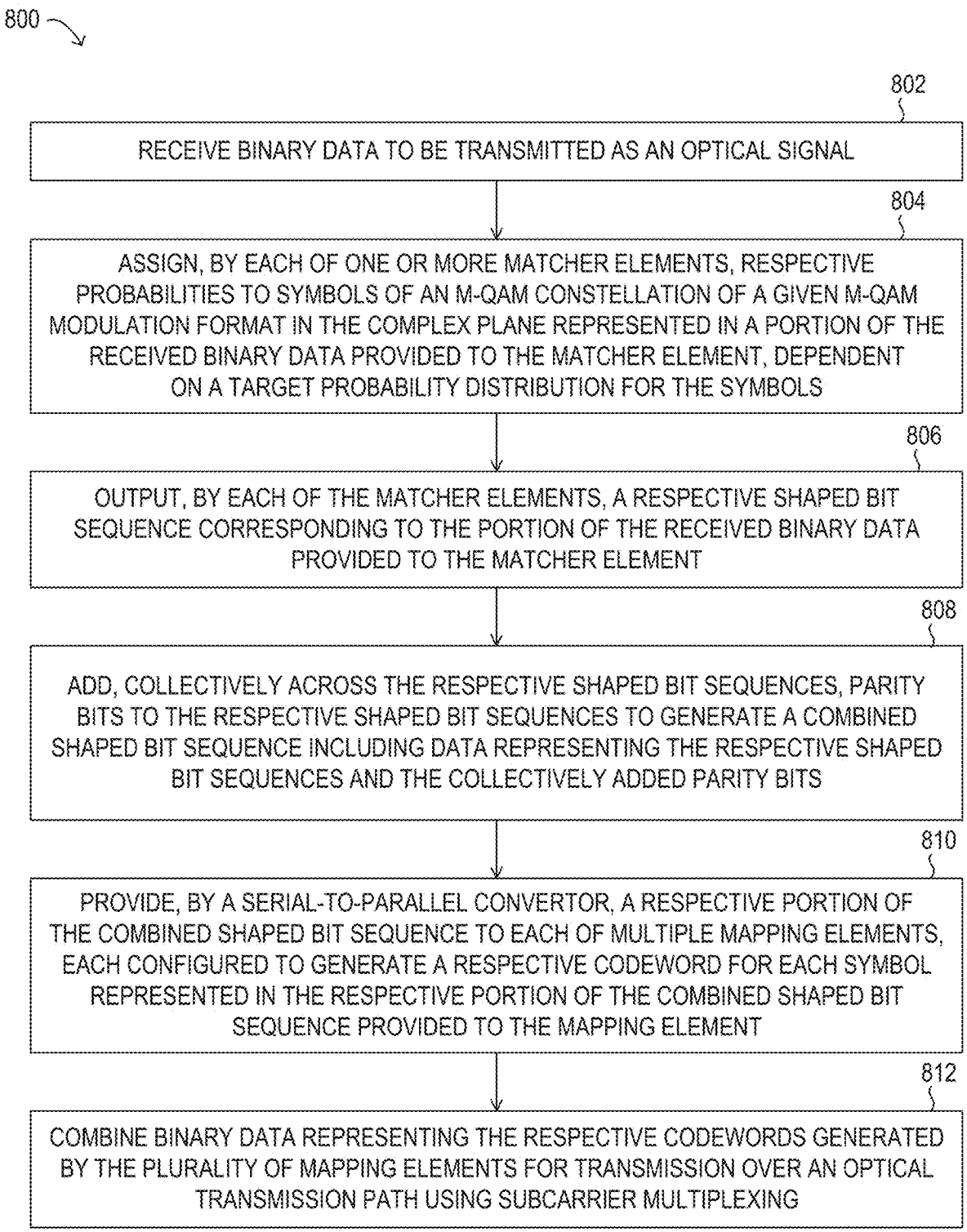
FIG. 8 is a block diagram of selected elements of an embodiment of method for error correction in optical networks that implement both probabilistic shaping and symbol rate optimization depicted in flowchart form.

Referring now to FIG. 8, a block diagram of selected elements of an embodiment of method 800 for error correction in optical networks that implement both probabilistic shaping and symbol rate optimization, as described herein, is depicted in flowchart form. Method 800 may be performed using optical transport network 101. In some embodiments, network management system 300 illustrated in FIG. 3 may be used to obtain path information as well as send commands to optical transmitters and optical receivers to configure them for probabilistic constellation shaping and symbol rate optimization using subcarrier multiplexing, as described herein. It is noted that certain operations described in method 800 may be optional or may be rearranged in different embodiments.

Method 800 may begin at 802 by receiving, at an optical transmitter, binary data in a single binary bit stream to be transmitted as an optical signal.

At 804, method 800 includes assigning, by each of one or more matcher elements, respective probabilities to symbols of an M-QAM constellation of a given M-QAM modulation format in the complex plane represented in a portion of the received binary data provided to the matcher element, dependent on a target probability distribution for the symbols. As described in more detail below, in some embodiments, the optical transmitter may include multiple matcher elements. In other embodiments, the optical transmitted may include only a single matcher element. Each of the matcher elements may be similar to distribution matcher 404 illustrated in FIG. 4 or one of the distribution matchers 604 illustrated in FIG. 6A.

At 806, method 800 includes outputting, by each of the matcher elements, a respective shaped bit sequence corresponding to the portion of the received binary data provided to the matcher element.

At 808, the method includes adding, collectively across the respective shaped bit sequences, parity bits to the respective shaped bit sequences to generate a combined shaped bit sequence including data representing the respective shaped bit sequences and the collectively added parity bits. In at least some embodiments, a single systematic error correction encoder may be configured to add parity bits collectively across shaped bit sequences without changing the amplitudes of the symbols represented in the shaped bit sequences. For example, a single systematic FEC encoder may add the parity bits as sign bits that are applied across shaped bit sequences output by respective matcher elements.

At 810, method 800 includes providing, by a serial-to-parallel convertor, a respective portion of the combined shaped bit sequence to each of multiple mapping elements, each of which is configured to generate a respective codeword for each symbol represented in the respective portion of the combined shaped bit sequence provided to the mapping element.

At 812, the method includes combining binary data representing the respective codewords generated by the plurality of mapping elements for transmission over an optical transmission path using subcarrier multiplexing.

In at least some embodiments, the operations shown as 802 through 812 may be repeated periodically or continuously as a binary bit stream is received at the optical transmitter.

In some embodiments, the transmitter portion of the optical transmission systems described herein may include multiple parallel distribution matchers. In some cases, the use of parallel distribution matchers may allow the data rate for each distribution matcher to be lowered, compared to the data rate of the incoming serial bit stream.

Figure 9A:
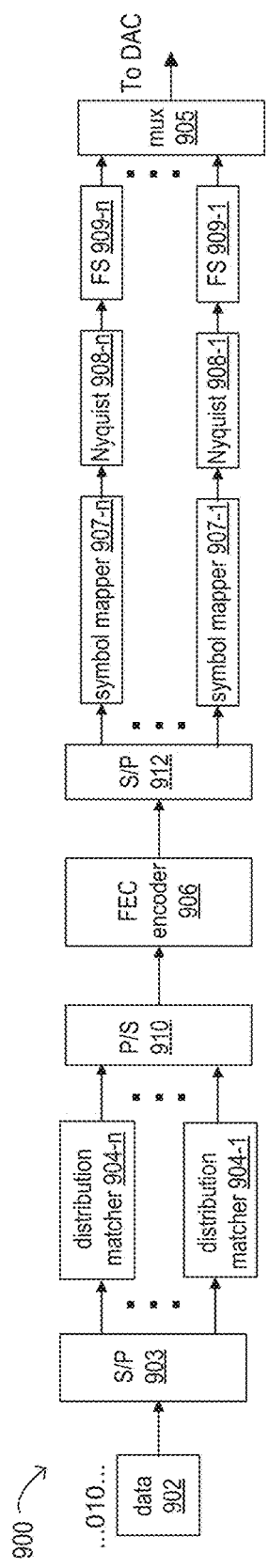
FIG. 9A is a schematic diagram illustrating selected elements of a transmitter portion of an example optical transmission system configured to apply probabilistic constellation shaping and symbol rate optimization and including multiple distribution matchers, according to some embodiments.

FIG. 9A is a schematic diagram illustrating selected elements of a transmitter portion 900 of an example optical transmission system configured to apply probabilistic constellation shaping and symbol rate optimization and including multiple distribution matchers, according to some embodiments. For example, transmitter portion 900 may be configured to perform probabilistic shaping based on M-QAM, in addition to performing symbol rate optimization using subcarrier multiplexing. In the illustrated embodiment, some, but not all, of the elements of the transmitter portion 900 of the optical transmission system may be similar to elements of the transmitter portion of optical transmission system 400 illustrated in FIG. 4 or the transmitter portion 600 illustrated in FIG. 6A. The depiction of transmitter portion 900 is a schematic representation and is not drawn to scale. In various embodiments, transmitter portion 900 may be implemented with more, fewer, or different elements than those depicted in FIG. 9A. In some embodiments, transmitter portion 900 may include a field-programmable gate array (FPGA) for performing at least some of the functionality described herein. In some embodiments, transmitter portion 900 may include a digital signal processor (DSP), which may include (or have access to) a memory storing instructions executable by the DSP for performing at least some of the functionality described herein. In the illustrated embodiment, the transmitter portion 900 includes binary data 902 that is provided for transmission to a receiver portion of the optical transmission system. In at least some embodiments, transmitter portion 900 illustrated in FIG. 9A may represent one of two transmitter portions of the optical transmission system, each of which is configured to generate the real (I) portion or imaginary (Q) portion of the data 902 for optical modulation that is converted to analog signals by a respective digital to analog converter (DAC).

In the illustrated embodiment, the transmitter portion 900 includes binary data 902 that is provided for transmission to a receiver portion of the optical transmission system. A first serial-to-parallel converter 903 splits the incoming binary data 902 into n streams, each initially directed to a respective processing path for processing in parallel. In at least some embodiments, there is a one-to-one mapping between the n parallel processing paths and n subcarrier channels over which information represented in binary data 902 is carried from the transmitter portion 900 to the receiver portion.

In the illustrated embodiment, transmitter portion 900 includes multiple distribution matchers 904, including one for each of the parallel streams generated by the first serial-to-parallel converter 903. Transmitter portion 900 includes a parallel-to-serial converter 910 that combines the outputs of the multiple distribution matchers 904, which include respective shaped bit sequences, and provides an intermediate combined shaped bit sequence to a single systematic FEC encoder 906. The single systematic FEC encoder 906 applies parity bits collectively across the intermediate combined shaped bit sequence, as sign bits of the respective probabilities represented in the intermediate combined shaped bit sequence, to generate a final combined shaped bit sequence. A second serial-to-parallel converter 912 splits the final combined shaped bit sequence back into n streams for further processing on parallel processing paths. For example, transmitter portion 900 includes multiple symbol mappers 907, including one for each of the parallel streams, multiple Nyquist filtering elements 908, including one for each of the parallel streams, and multiple frequency shifting elements 909, including one for each of the parallel streams. As illustrated in FIG. 9A, in at least some embodiments, for each subcarrier 1 to n, transmitter portion 900 may perform symbol mapping and Nyquist filtering before frequency shifting (FS) is applied. In the illustrated embodiment, the outputs of the multiple processing paths, each of which includes binary data representing various codewords, are combined by a single subcarrier multiplexer 905 for transmission to the optical receiver over the optical transmission path using subcarrier multiplexing. For example, subcarrier multiplexer 905 may be configured to combine the individual subcarrier data output by the multiple processing paths into either the real (I) portion or the imaginary (Q) portion of the optical signal to be transmitted.

Figure 9B:
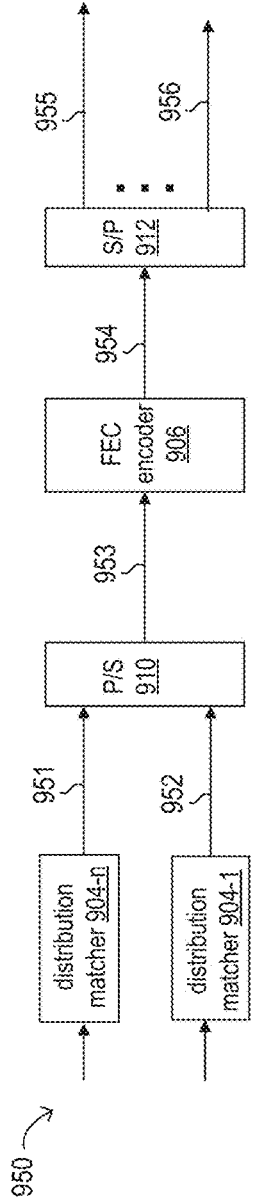
FIG. 9B is a schematic diagram illustrating a subset of the elements of the transmitter portion of an example optical transmission system depicted in FIG. 9A, according to some embodiments.

FIG. 9B is a schematic diagram illustrating a subset 950 of the elements of the transmitter portion of an example optical transmission system depicted in FIG. 9A, according to some embodiments. In one example, the shaped bit sequence output by distribution matcher 904-*n* is shown as 951. Shaped bit sequence 951 includes four bits with values of 0110. Shaped bit sequence 951 represents two probability amplitude bits for each of two symbols, where, reading from right to left, a first symbol includes the two bold probability amplitude bits 10 and a second symbol includes the two italicized probability amplitude bits 01. The shaped bit sequence output by distribution matcher 904-1 is shown as 952. Shaped bit sequence 952 includes four bits with values of 1101. Shaped bit sequence 952 represents two probability amplitude bits for each of two symbols, where, reading from right to left, a third symbol includes the two bold and italicized probability amplitude bits 01 and a fourth symbol includes the two regular probability amplitude bits 11. The outputs of the two distribution matchers 904 are combined by parallel-to-serial converter 910 to produce an intermediate combined shaped bit sequence shown as 953. In this example, the intermediate combined shaped bit sequence 953 includes the eight bits of the shaped bit sequences 951 and 952, which have been interleaved and re-ordered as 01111001.

As previously noted, a single systematic error correction encoder may be configured to add parity bits collectively across shaped bit sequences without changing the amplitudes of the symbols represented in the shaped bit sequences. For example, systematic FEC encoder 906 may add the parity bits as sign bits that are applied across shaped bit sequences output by respective matcher elements. In this example, FEC encoder 906 adds four parity bits 1011 to the intermediate combined shaped bit sequence 953 as sign bits, generating a final combined shaped bit sequence 954. These parity bits are added across the respective symbols represented in intermediate combined shaped bit sequence 953, alternating between symbols output by distribution matcher 904-*n* and symbols output by distribution matcher 904-1. More specifically, the individual parity bits 1011 are added, from right to left, as sign bits to the first symbol, the third symbol, the second symbol, and the fourth symbol, respectively, in the final combined shaped bit sequence 954, and the final combined shaped bit sequence 954 is provided as an input to the second serial-to-parallel converter 912. The individual bit streams output by the second serial-to-parallel converter 912 are shown as stream 955, which includes bits 001110 and stream 956, which includes bits 111101, where, for each group of three bits, the underlined bit represents the sign of a respective probability and the remaining bits represent the amplitude of the respective probability.

Note that, in practice, the optical transmission systems described herein may implement subcarrier multiplexing involving dozens, if not hundreds or even thousands, or subcarrier channels. Both the transmitter portions and the receiver portions of these optical transmission systems may include many more than two distribution matchers, distribution de-matchers, and other components in parallel processing streams. In these systems, sign bits may be assigned to particular shaped bit sequences, or portions thereof, in a round robin fashion across the many subcarrier channels.

Figure 9C:
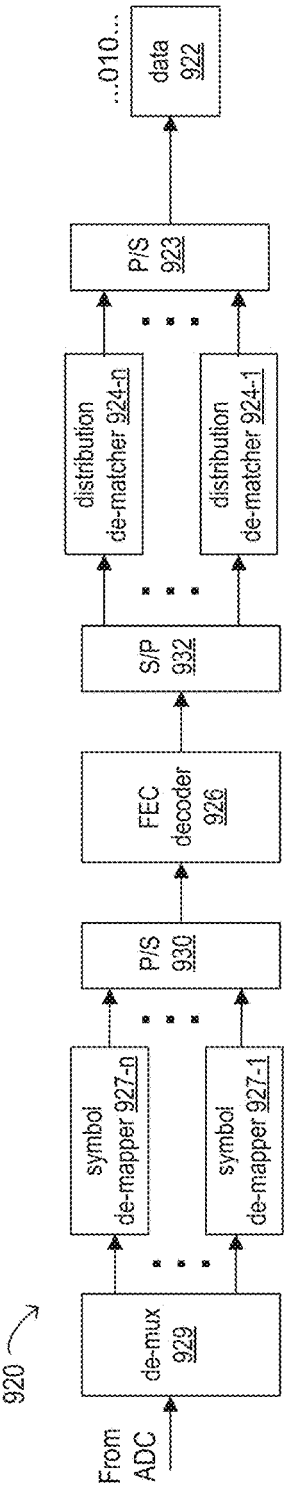
FIG. 9C is a schematic diagram illustrating selected elements of a receiver portion of an example optical transmission system configured to recover information from optical signals received from the transmitter portion depicted in FIG. 9A, according to some embodiments.

FIG. 9C is a schematic diagram illustrating selected elements of a receiver portion 920 of an example optical transmission system configured to recover information from optical signals received from the transmitter portion depicted in FIG. 9A. In the illustrated embodiment, at least some of the elements of the receiver portion 920 of the optical transmission system are similar to elements of the receiver portion of optical transmission system 400 illustrated in FIG. 4 or the receiver portion 620 illustrated in FIG. 6B. The depiction of receiver portion 920 is a schematic representation and is not drawn to scale. In various embodiments, receiver portion 920 may be implemented with more, fewer, or different elements than those depicted in FIG. 9B. In some embodiments, receiver portion 920 may include a field-programmable gate array (FPGA) for performing at least some of the functionality described herein. In some embodiments, receiver portion 920 may include a digital signal processor (DSP), which may include (or have access to) a memory storing instructions executable by the DSP for performing at least some of the functionality described herein. In the illustrated embodiment, the receiver portion 920 receives, from an analog-to-digital converter, a digitized signal for a transmitted optical signal in a coherent optical receiver of the optical transmission system. In at least some embodiments, receiver portion 920 illustrated in FIG. 9C may represent one of two receiver portions of the optical transmission system, which are configured to receive binary data representing the real (I) portion and the imaginary (Q) portion of the optical signal received from the transmitter portion of the optical transmission system, respectively.

In the illustrated embodiment, the receiver portion 920 includes a single subcarrier de-multiplexer 929 that splits the incoming optical signal into n streams, each initially directed to a respective processing path for processing in parallel. In some embodiments, subcarrier de-multiplexer 929 may include an adaptive equalizer, a carrier phase recovery element, or other functional elements of an optical receiver (not shown in FIG. 9B). In at least some embodiments, there is a one-to-one mapping between the n parallel processing paths and n subcarrier channels over which information is received from the transmitter portion 900.

In the illustrated embodiment, receiver portion 920 includes multiple symbol de-mappers 927, including one for each of the parallel streams. Receiver portion 920 includes a first parallel-to-serial converter 930 that combines the outputs of the multiple symbol de-mappers 927 and provides an intermediate combined output to a single FEC decoder 926. The single FEC decoder 926 extracts the parity bits that were applied collectively across the intermediate combined shaped bit sequence by FEC encoder 906 in the transmitter portion 900 as sign bits of the respective probabilities represented in the intermediate combined shaped bit sequence. A serial-to-parallel converter 932 splits the output of the FEC decoder 926 back into n streams for further processing on parallel processing paths. For example, receiver portion 920 includes multiple distribution de-matchers 924, including one for each stream. In the illustrated embodiment, a second parallel-to-serial converter 923 combines the outputs of the parallel processing paths to recover transmitted information as data 922. For example, the second parallel-to-serial converter 923 may be configured to combine the outputs of the parallel processing paths of receiver portion 920 to recover data representing either the real (I) portion or the imaginary (Q) portion of the received optical signal.

In at least some embodiments, some of the incoming data bits may be used as sign bits. For example, for subcarrier modulation, the data bits that can be used as sign bits may be tapped out and provided to the FEC encoder as additional sign bits. As described below in reference to FIGS. 10A and 11A, the tapping point may be located in any of several suitable locations, in different embodiments. In addition, different numbers of data bits may be tapped out, depending on the desired FEC rate.

FIG. 10A is a schematic diagram illustrating selected elements of a transmitter portion 1000 of an example optical transmission system configured to apply probabilistic constellation shaping and symbol rate optimization and including multiple distribution matchers and tap elements on multiple binary data streams, according to some embodiments. For example, transmitter portion 1000 may be configured to perform probabilistic shaping based on M-QAM, in addition to performing symbol rate optimization using subcarrier multiplexing. In the illustrated embodiment, some, but not all, of the elements of the transmitter portion 1000 of the optical transmission system may be similar to elements of the transmitter portion of optical transmission system 400 illustrated in FIG. 4 or the transmitter portion 600 illustrated in FIG. 6A. The depiction of transmitter portion 1000 is a schematic representation and is not drawn to scale. In various embodiments, transmitter portion 1000 may be implemented with more, fewer, or different elements than those depicted in FIG. 10A. In some embodiments, transmitter portion 1000 may include a field-programmable gate array (FPGA) for performing at least some of the functionality described herein. In some embodiments, transmitter portion 1000 may include a digital signal processor (DSP), which may include (or have access to) a memory storing instructions executable by the DSP for performing at least some of the functionality described herein. In the illustrated embodiment, the transmitter portion 1000 includes binary data 1002 that is provided for transmission to a receiver portion of the optical transmission system. In the illustrated embodiment, the transmitter portion 1000 includes binary data 1002 that is provided for transmission to a receiver portion of the optical transmission system. In at least some embodiments, transmitter portion 1000 illustrated in FIG. 10A may represent one of two transmitter portions of the optical transmission system, each of which is configured to generate the real (I) portion or imaginary (Q) portion of the data 1002 for optical modulation that is converted to analog signals by a respective digital to analog converter (DAC).

A first serial-to-parallel converter 1003 splits the incoming binary data 1002 into n streams, each initially directed to a respective processing path for processing in parallel. In at least some embodiments, there is a one-to-one mapping between the n parallel processing paths and n subcarrier channels over which information represented in binary data 1002 is carried from the transmitter portion 1000 to the receiver portion.

In the illustrated embodiment, transmitter portion 1000 includes multiple distribution matchers 1004, including one for each of the parallel streams generated by the first serial-to-parallel converter 1003. Transmitter portion 1000 includes a first parallel-to-serial converter 1010 that combines the outputs of the multiple distribution matchers 1004, which include respective shaped bit sequences, and provides an intermediate combined shaped bit sequence to a single systematic FEC encoder 1006. The single systematic FEC encoder 1006 applies parity bits collectively across the intermediate combined shaped bit sequence, as sign bits of the respective probabilities represented in the intermediate combined shaped bit sequence, to generate a final combined shaped bit sequence. In the illustrated embodiment, transmitter portion 1000 also includes, for each of the n parallel streams output by serial-to-parallel converter 1003, a respective tap element configured to tap one or more bits from the binary data stream and to provide the tapped bits, shown as tapped bits 1051 and 1052, to a second parallel-to-serial converter 1011. The second parallel-to-serial converter 1011 may be configured to combine the tapped bits and provide the combined tapped bits to the single systematic FEC encoder 1006, which applies them collectively across the intermediate combined shaped bit sequence as additional sign bits. The combined tapped bits, shown at 1055, may also be re-integrated by a combining element into the output of the single systematic FEC encoder 1006 prior to its input to second serial-to-parallel converter 1012.

In one example, the shaped bit sequence output by distribution matcher 1004-$n$ is shown as 1053. Shaped bit sequence 1053 includes four bits with values of 0110. Shaped bit sequence 1053 represents two probability amplitude bits for each of two symbols, where, reading from right to left, a first symbol includes the two bold probability amplitude bits 10 and a second symbol includes the two italicized probability amplitude bits 01. The shaped bit sequence output by distribution matcher 1004-1 is shown as 1054. Shaped bit sequence 1054 includes four bits with values of 1101. Shaped bit sequence 1054 represents two probability amplitude bits for each of two symbols, where, reading from right to left, a third symbol includes the two bold and italicized probability amplitude bits 01 and a fourth symbol includes the two regular probability amplitude bits 11. The outputs of the two distribution matchers 1004 are combined by parallel-to-serial converter 1010 to produce an intermediate combined shaped bit sequence. In this example, the intermediate combined shaped bit sequence includes the eight bits of the shaped bit sequences 1053 and 1054, which have been interleaved and re-ordered as 01111001. As illustrated in FIG. 10A, this intermediate combined shaped bit sequence may be provided, along with the combined tapped bits 1055, as input to FEC encoder 1006.

As previously noted, a systematic error correction encoder may be configured to add parity bits collectively across shaped bit sequences without changing the amplitudes of the symbols represented in the shaped bit sequences. For example, systematic FEC encoder 1006 may add the parity bits as sign bits that are applied across shaped bit sequences output by respective matcher elements. In transmitter portion 1000, second serial-to-parallel converter 1012 splits the final combined shaped bit sequence, into which the combined tapped bits 1055 have been re-integrated, back into n streams for further processing on parallel processing paths. In this example, the input to the upper processing path, shown as 1056, may include six bits with values of 001110, which includes added sign bits as a respective underlined bit prepended to each 2-bit amplitude value. The input to the lower processing path, shown as 1057, may include six bits with values of 111101, which includes added sign bits as a respective underlined bit prepended to each 2-bit amplitude value.

In the illustrated embodiment, transmitter portion 1000 includes multiple symbol mappers 1007, including one for each of the parallel streams, multiple Nyquist filtering elements 1008, including one for each of the parallel streams, and multiple frequency shifting elements 1009, including one for each of the parallel streams. As illustrated in FIG. 10A, in at least some embodiments, for each subcarrier 1 to n, transmitter portion 1000 may perform symbol mapping and Nyquist filtering before frequency shifting (FS) is applied. In the illustrated embodiment, the outputs of the multiple processing paths, each of which includes binary data representing various codewords, are combined by a single subcarrier multiplexer 1005 for transmission to the optical receiver over the optical transmission path using subcarrier multiplexing. For example, subcarrier multiplexer 1005 may be configured to combine the individual subcarrier data output by the multiple processing paths into either the real (I) portion or the imaginary (Q) portion of the optical signal to be transmitted.

FIG. 10B is a schematic diagram illustrating selected elements of a receiver portion 1020 of an example optical transmission system configured to recover information from optical signals received from the transmitter portion depicted in FIG. 10A, according to some embodiments. The depiction of receiver portion 1020 is a schematic representation and is not drawn to scale. In various embodiments, receiver portion 1020 may be implemented with more, fewer, or different elements than those depicted in FIG. 10B. In some embodiments, receiver portion 1020 may include a field-programmable gate array (FPGA) for performing at least some of the functionality described herein. In some embodiments, receiver portion 1020 may include a digital signal processor (DSP), which may include (or have access to) a memory storing instructions executable by the DSP for performing at least some of the functionality described herein. In the illustrated embodiment, the receiver portion 1020 receives, from an analog-to-digital converter, a digitized signal for a transmitted optical signal in a coherent optical receiver of the optical transmission system. In at least some embodiments, receiver portion 1020 illustrated in FIG. 10B may represent one of two receiver portions of the optical transmission system, which are configured to receive binary data representing the real (I) portion or imaginary (Q) portion of the optical signal received from the transmitter portion of the optical transmission system, respectively.

In the illustrated embodiment, at least some of the elements of the receiver portion 1020 of the optical transmission system are similar to elements of the receiver portion of optical transmission system 400 illustrated in FIG. 4 or the receiver portion 620 illustrated in FIG. 6B. In the illustrated embodiment, the receiver portion 1020 includes a single subcarrier de-multiplexer 1029 that splits the incoming optical signal into n streams, each initially directed to a respective processing path for processing in parallel. In some embodiments, subcarrier de-multiplexer 1029 may include an adaptive equalizer, a carrier phase recovery element, or other functional elements of an optical receiver (not shown in FIG. 10B). In at least some embodiments, there is a one-to-one mapping between the n parallel processing paths and n subcarrier channels over which information is received from the transmitter portion 1000.

In the illustrated embodiment, receiver portion 1020 includes multiple symbol de-mappers 1027, including one for each of the parallel streams. Receiver portion 1020 includes a first parallel-to-serial converter 1030 that combines the outputs of the multiple symbol de-mappers 1027 and provides an intermediate combined output to a single FEC decoder 1026. The single FEC decoder 1026 extracts the parity bits that were applied collectively across the intermediate combined shaped bit sequence by FEC encoder 1006 in the transmitter portion 1000 as sign bits of the respective probabilities represented in the intermediate combined shaped bit sequence, shown as extracted parity bits 1058. A first serial-to-parallel converter 1032 splits the output of the FEC decoder 1026 back into n streams for further processing on parallel processing paths. For example, receiver portion 1020 includes multiple distribution de-matchers 1024, including one for each stream. In the illustrated embodiment, receiver portion 1020 includes a second serial-to-parallel converter 1034 that receives the extracted parity bits 1058 and splits them into data bits to be re-integrated with the outputs of respective ones of the distribution matchers 1024. For example, bits 1059 are combined with the output of distribution de-matcher 1024-1 and bits 1060 are combined with the output of distribution de-matcher 1024-n. In the illustrated embodiment, a second parallel-to-serial converter 1023 combines the outputs of the parallel processing paths, into which respective extracted parity bits 1048 have been re-integrated, to recover transmitted information as data 1022. For example, the second parallel-to-serial converter 1023 may be configured to combine the outputs of the parallel processing paths of receiver portion 1020 to recover data representing either the real (I) portion or the imaginary (Q) portion of the received optical signal.

Figure 11A:
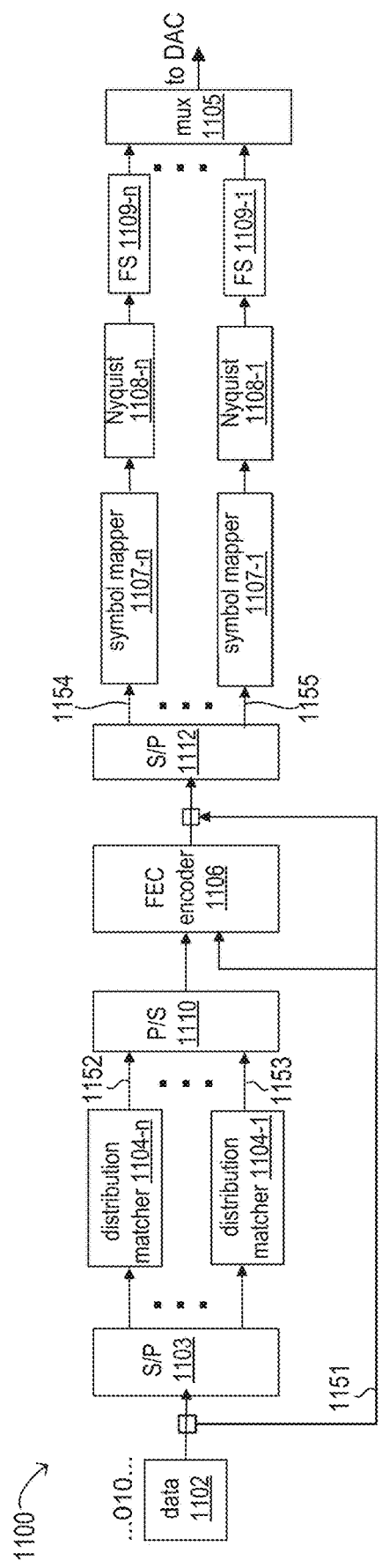
FIG. 11A is a schematic diagram illustrating selected elements of a transmitter portion of an example optical transmission system configured to apply probabilistic constellation shaping and symbol rate optimization and including multiple distribution matchers and one or more tap elements on a single input binary data stream, according to some embodiments.

FIG. 11A is a schematic diagram illustrating selected elements of a transmitter portion 1100 of an example optical transmission system configured to apply probabilistic constellation shaping and symbol rate optimization and including multiple distribution matchers and one or more tap elements on a single input binary data stream, according to some embodiments. For example, transmitter portion 1000 may be configured to perform probabilistic shaping based on M-QAM, in addition to performing symbol rate optimization using subcarrier multiplexing. In the illustrated embodiment, some, but not all, of the elements of the transmitter portion 1100 of the optical transmission system may be similar to elements of the transmitter portion of optical transmission system 400 illustrated in FIG. 4 or the transmitter portion 600 illustrated in FIG. 6A. The depiction of transmitter portion 1100 is a schematic representation and is not drawn to scale. In various embodiments, transmitter portion 1100 may be implemented with more, fewer, or different elements than those depicted in FIG. 11A. In some embodiments, transmitter portion 1100 may include a field-programmable gate array (FPGA) for performing at least some of the functionality described herein. In some embodiments, transmitter portion 1100 may include a digital signal processor (DSP), which may include (or have access to) a memory storing instructions executable by the DSP for performing at least some of the functionality described herein. In the illustrated embodiment, the transmitter portion 1100 includes binary data 1102 that is provided for transmission to a receiver portion of the optical transmission system. In at least some embodiments, transmitter portion 1100 illustrated in FIG. 11A may represent one of two transmitter portions of the optical transmission system, each of which is configured to generate the real (I) portion or imaginary (Q) portion of the data 1102 for optical modulation that is converted to analog signals by a respective digital to analog converter (DAC).

In the illustrated embodiment, the transmitter portion 1100 includes binary data 1102 that is provided for transmission to a receiver portion of the optical transmission system. A first serial-to-parallel converter 1103 splits the incoming binary data 1102 into n streams, each initially directed to a respective processing path for processing in parallel. In at least some embodiments, there is a one-to-one mapping between the n parallel processing paths and n subcarrier channels over which information represented in binary data 1102 is carried from the transmitter portion 1100 to the receiver portion.

In the illustrated embodiment, transmitter portion 1100 includes multiple distribution matchers 1104, including one for each of the parallel streams generated by the first serial-to-parallel converter 1103. Transmitter portion 1100 includes a parallel-to-serial converter 1110 that combines the outputs of the multiple distribution matchers 1104, which include respective shaped bit sequences, and provides an intermediate combined shaped bit sequence to a single systematic FEC encoder 1106. The single systematic FEC encoder 1106 applies parity bits collectively across the intermediate combined shaped bit sequence, as sign bits of the respective probabilities represented in the intermediate combined shaped bit sequence, to generate a final combined shaped bit sequence. In the illustrated embodiment, transmitter portion 1100 also includes a tap element configured to tap one or more bits from the input binary data stream 1102 and to provide the tapped bits, shown as tapped bits 1151, to the single systematic FEC encoder 1106, which applies them collectively across the intermediate combined shaped bit sequence as additional sign bits. As illustrated in FIG. 11A, the combined tapped bits 1151 may also be re-integrated by a combining element into the output of the single systematic FEC encoder 1106 prior to its input to second serial-to-parallel converter 1112.

In one example, the shaped bit sequence output by distribution matcher 1104-*n* is shown as 1152. Shaped bit sequence 1152 includes four bits with values of 0110. Shaped bit sequence 1152 represents two probability amplitude bits for each of two symbols, where, reading from right to left, a first symbol includes the two bold probability amplitude bits 10 and a second symbol includes the two italicized probability amplitude bits 01. The shaped bit sequence output by distribution matcher 1104-1 is shown as 1153. Shaped bit sequence 1153 includes four bits with values of 1101. Shaped bit sequence 1153 represents two probability amplitude bits for each of two symbols, where, reading from right to left, a third symbol includes the two bold and italicized probability amplitude bits 01 and a fourth symbol includes the two regular probability amplitude bits 11. The outputs of the two distribution matchers 1104 are combined by parallel-to-serial converter 1110 to produce an intermediate combined shaped bit sequence. In this example, the intermediate combined shaped bit sequence includes the eight bits of the shaped bit sequences 1152 and 1153, and may be provided, along with the tapped bits 1151, as input to FEC encoder 1106.

As previously noted, a systematic error correction encoder may be configured to add parity bits collectively across shaped bit sequences without changing the amplitudes of the symbols represented in the shaped bit sequences. For example, systematic FEC encoder 1106 may add the parity bits as sign bits that are applied across shaped bit sequences output by respective matcher elements to produce a final combined shaped bit sequence. In various embodiments, FEC encoder 1106 may utilize a minimum FEC rate or may implement a configurable FEC rate. An example FEC encoder for utilizing a minimum FEC rate and/or a configurable FEC rate is illustrated in FIG. 12B and described in detail below. In transmitter portion 1100, a second serial-to-parallel converter 1112 splits the final combined shaped bit sequence, into which the tapped bits 1151 have been re-integrated, back into n streams for further processing on parallel processing paths. In this example, the input to the upper processing path, shown as 1157, may include six bits with values of 001110, which includes added sign bits as a respective underlined bit prepended to each 2-bit amplitude value. The input to the lower processing path, shown as 1158, may include six bits with values of 111101, which includes added sign bits as a respective underlined bit prepended to each 2-bit amplitude value.

In the illustrated embodiment, transmitter portion 1100 includes multiple symbol mappers 1107, including one for each of the parallel streams, multiple Nyquist filtering elements 1108, including one for each of the parallel streams, and multiple frequency shifting elements 1109, including one for each of the parallel streams. As illustrated in FIG. 11A, in at least some embodiments, for each subcarrier 1 to n, transmitter portion 1100 may perform symbol mapping and Nyquist filtering before frequency shifting (FS) is applied. In the illustrated embodiment, the outputs of the multiple processing paths, each of which includes binary data representing various codewords, are combined by a single subcarrier multiplexer 1105 for transmission to the optical receiver over the optical transmission path using subcarrier multiplexing. For example, subcarrier multiplexer 1105 may be configured to combine the individual subcarrier data output by the multiple processing paths into either the real (I) portion or the imaginary (Q) portion of the optical signal to be transmitted.

Figure 11B:
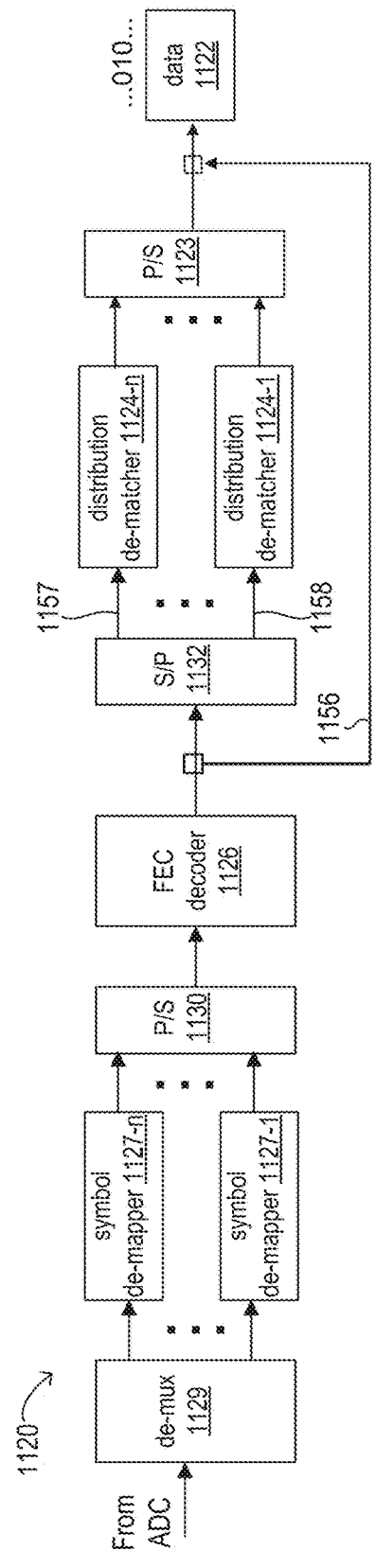
FIG. 11B is a schematic diagram illustrating selected elements of a receiver portion of an example optical transmission system configured to recover information from optical signals received from the transmitter portion depicted in FIG. 11A, according to some embodiments.

FIG. 11B is a schematic diagram illustrating selected elements of a receiver portion 1120 of an example optical transmission system configured to recover information from optical signals received from the transmitter portion depicted in FIG. 11A, according to some embodiments. In the illustrated embodiment, at least some of the elements of the receiver portion 1120 of the optical transmission system are similar to elements of the receiver portion of optical transmission system 400 illustrated in FIG. 4 or the receiver portion 620 illustrated in FIG. 6B. The depiction of receiver portion 1120 is a schematic representation and is not drawn to scale. In various embodiments, receiver portion 1120 may be implemented with more, fewer, or different elements than those depicted in FIG. 11B. In some embodiments, receiver portion 1120 may include a field-programmable gate array (FPGA) for performing at least some of the functionality described herein. In some embodiments, receiver portion 1120 may include a digital signal processor (DSP), which may include (or have access to) a memory storing instructions executable by the DSP for performing at least some of the functionality described herein. In the illustrated embodiment, the receiver portion 1120 receives, from an analog-to-digital converter, a digitized signal for a transmitted optical signal in a coherent optical receiver of the optical transmission system. In at least some embodiments, receiver portion 1120 illustrated in FIG. 11B may represent one of two receiver portions of the optical transmission system, each of which is configured to receive binary data representing the real (I) portion or imaginary (Q) portion of the optical signal received from the transmitter portion of the optical transmission system, respectively.

In the illustrated embodiment, the receiver portion 1120 includes a single subcarrier de-multiplexer 1129 that splits the incoming optical signal into n streams, each initially directed to a respective processing path for processing in parallel. In some embodiments, subcarrier de-multiplexer 1129 may include an adaptive equalizer, a carrier phase recovery element, or other functional elements of an optical receiver (not shown in FIG. 11B). In at least some embodiments, there is a one-to-one mapping between the n parallel processing paths and n subcarrier channels over which information is received from the transmitter portion 1100.

In the illustrated embodiment, receiver portion 1120 includes multiple symbol de-mappers 1127, including one for each of the parallel streams. Receiver portion 1120 includes a first parallel-to-serial converter 1130 that combines the outputs of the multiple symbol de-mappers 1127 and provides an intermediate combined output to a single FEC decoder 1126. The single FEC decoder 1126 extracts the parity bits that were applied collectively across the intermediate combined shaped bit sequence by FEC encoder 1106 in the transmitter portion 1100 as sign bits of the respective probabilities represented in the intermediate combined shaped bit sequence, shown as extracted parity bits 1156. A serial-to-parallel converter 1132 splits the output of the FEC decoder 1126 back into n streams for further processing on parallel processing paths. For example, receiver portion 1120 includes multiple distribution de-matchers 1124, including one for each stream. In this example, bits 1158 are input to distribution de-matcher 1124-1 and bits 1157 are input to distribution de-matcher 1124-n. A second parallel-to-serial converter 1123 combines the outputs of the parallel processing paths to recover the transmitted information as data 1122. In the illustrated embodiment, the extracted parity bits 1156 are re-integrated with the output of the second parallel-to-serial converter 1123 as additional bits of the recovered information shown as data 1122. For example, the recovered information may include data representing either the real (I) portion or the imaginary (Q) portion of the received optical signal.

Figure 12A:
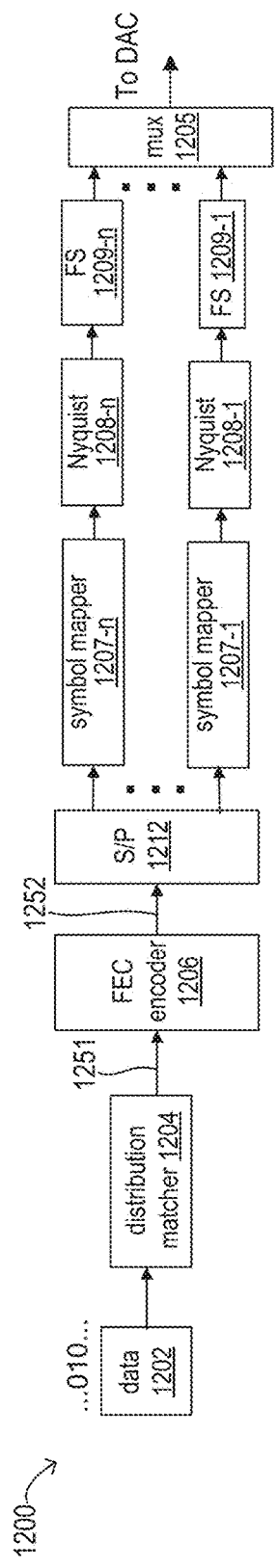
FIG. 12A is a schematic diagram illustrating selected elements of a transmitter portion of an example optical transmission system configured to apply probabilistic constellation shaping and symbol rate optimization and including a single distribution matcher, according to some embodiments.
Figure 12B:
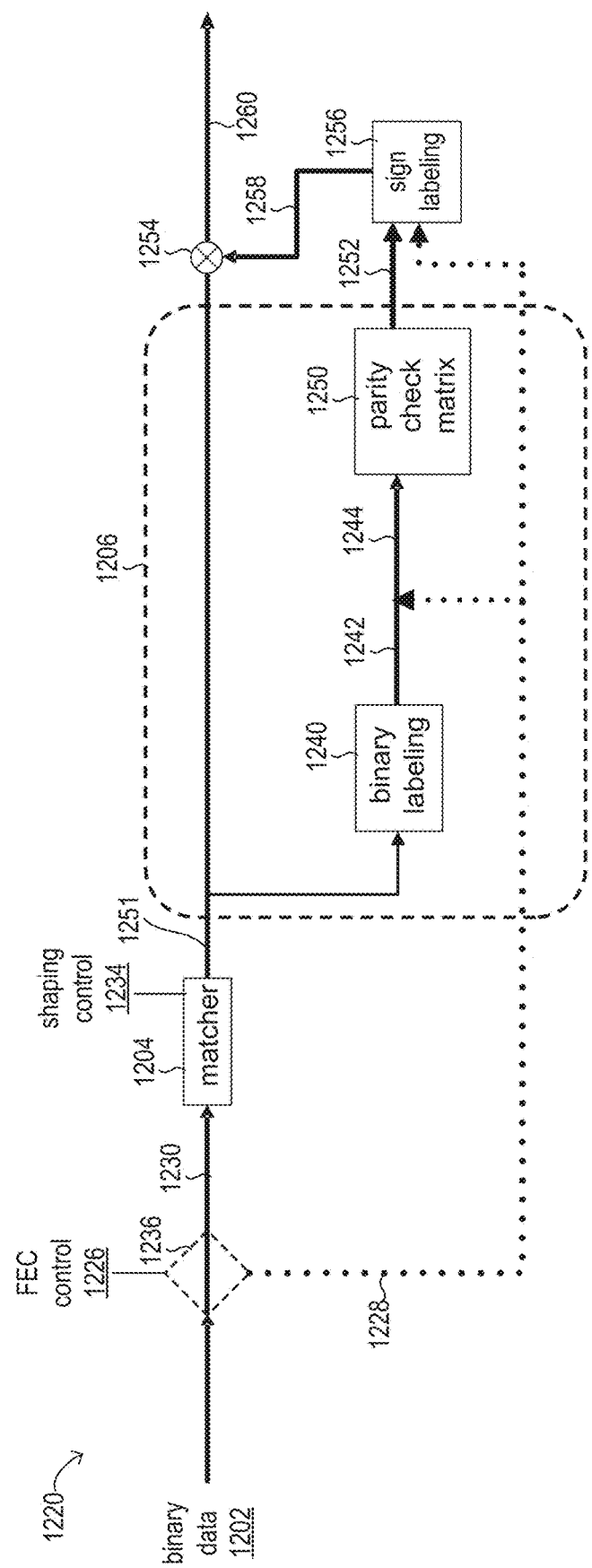
FIG. 12B is a schematic diagram illustrating selected elements of a transmitter portion of an example optical transmission system configured to apply probabilistic constellation shaping and symbol rate optimization and including a single distribution matcher and error correction rate control, according to some embodiments.

FIG. 12A is a schematic diagram illustrating selected elements of a transmitter portion 1200 of an example optical transmission system configured to apply probabilistic constellation shaping and symbol rate optimization and including a single distribution matcher, according to some embodiments. For example, transmitter portion 1200 may be configured to perform probabilistic shaping based on M-QAM, in addition to performing symbol rate optimization using subcarrier multiplexing. In the illustrated embodiment, some, but not all, of the elements of the transmitter portion 1200 of the optical transmission system may be similar to elements of the transmitter portion of optical transmission system 400 illustrated in FIG. 4 or the transmitter portion 600 illustrated in FIG. 6A. The depiction of transmitter portion 1200 is a schematic representation and is not drawn to scale. In various embodiments, transmitter portion 1200 may be implemented with more, fewer, or different elements than those depicted in FIG. 12A. In some embodiments, transmitter portion 1200 may include a field-programmable gate array (FPGA) for performing at least some of the functionality described herein. In some embodiments, transmitter portion 1200 may include a digital signal processor (DSP), which may include (or have access to) a memory storing instructions executable by the DSP for performing at least some of the functionality described herein. In the illustrated embodiment, the transmitter portion 1200 includes binary data 1202 that is provided for transmission to a receiver portion of the optical transmission system. In at least some embodiments, transmitter portion 1200 illustrated in FIG. 12A may represent one of two transmitter portions of the optical transmission system, each of which is configured to generate the real (I) portion or imaginary (Q) portion of the data 1202 for optical modulation that is converted to analog signals by a respective digital to analog converter (DAC).

The transmitter portion 1200 includes binary data 1202 that is provided for transmission to a receiver portion of the optical transmission system. In the illustrated embodiment, the incoming binary data 1202 is provided to a single distribution matcher 1204 as a single serial binary data stream. The output of the distribution matchers 1204 is a shaped bit sequence 1251, which is provided to a single systematic FEC encoder 1206. The single systematic FEC encoder 1206 applies parity bits as sign bits across the probabilities represented in the shaped bit sequence 1251 to generate a final shaped bit sequence.

A serial-to-parallel converter 1212 splits the final shaped bit sequence into n streams, each directed to a respective processing path for further processing in parallel. In at least some embodiments, there is a one-to-one mapping between the n parallel processing paths and n subcarrier channels over which information represented in binary data 1202 is carried from the transmitter portion 1200 to the receiver portion. For example, transmitter portion 1200 includes multiple symbol mappers 1207, including one for each of the parallel streams, multiple Nyquist filtering elements 1208, including one for each of the parallel streams, and multiple frequency shifting elements 1209, including one for each of the parallel streams. As illustrated in FIG. 12A, in at least some embodiments, for each subcarrier 1 to n, transmitter portion 1200 may perform symbol mapping and Nyquist filtering before frequency shifting (FS) is applied. In the illustrated embodiment, the outputs of the multiple processing paths, each of which includes binary data representing various codewords, are combined by a single subcarrier multiplexer 1205 for transmission to the optical receiver over the optical transmission path using subcarrier multiplexing. For example, subcarrier multiplexer 1205 may be configured to combine the individual subcarrier data output by the multiple processing paths into either the real (I) portion or the imaginary (Q) portion of the optical signal to be transmitted.

FIG. 12B is a schematic diagram illustrating additional details about a subset 1220 of the elements of the transmitter portion 1200 depicted in FIG. 12A, according to some embodiments. For example, subset 1220 includes binary data 1202, a single distribution matcher 1204, and a single systematic FEC encoder 1206. Subset 1220 also includes a sign labeling element 1256, and a combiner element 1254. The single systematic FEC encoder 1206 applies parity bits as sign bits across the probabilities represented in the shaped bit sequence 1251 to generate a final shaped bit sequence 1252. The single systematic FEC encoder 1206 includes a binary labeling element 1240 and a parity check matrix 1250. In some embodiments, the FEC encoder may implement a generator matrix [I|P], where I represents an identity matrix and P represents a parity matrix, such as parity check matrix 1250. The identity matrix I may be configured to simply copy incoming data bit sequences, while parity check matrix P 1250 may be configured to add parity check bits to the incoming bit sequences, as described herein. In this example, the optional FEC rate controller 1236 shown in FIG. 12B might not be present, or may be disabled, or the FEC control input 1226 to an included FEC rate controller 1236 may indicate that the minimum FEC rate should be utilized.

In some embodiments, the subset 1220 may be used in an optical transmission system in which the distribution matcher implements probabilistic amplitude shaping (PAS) and the FEC encoder implements a minimum FEC rate. In one example, the number of output amplitudes (block size) is given by $n_c=4$, and the bit level (symbol size) is given by $m=3$, resulting in a FEC rate $c=(m-1)/m=2/3$. In this example, the number of input bits per block is 8, the number of output bits per block is 12, and 8 bits will be recovered by a FEC decoder of a receiver portion of the optical transmission system. The size of the parity checking matrix may be given as $(m-1)*n_c \times m*n_c$.

In this example, there are eight possible symbols represented using a 3-bit binary code. As in the example symmetric symbol probability distribution illustrated in FIG. 7, the leftmost bit of the three bits representing each symbol may represent a sign bit, with a value of either '0' for negative values or '1' for positive values, while the remaining two bits may represent an amplitude. In this example, the two bits representing the amplitude may, collectively, represent values of '1' (corresponding to bit values 10), "3" (corresponding to bit values 11), "5" (corresponding to bit values 01), or "7" (corresponding to bit values 00). In this example, the input binary data 1202 includes eight bits with values of 10111101, which are provided to the distribution matcher 1204 as input 1230.

The distribution matcher 1204 creates a shaped bit sequence 1251 in accordance with a target probability distribution based on input 1230 and a shaping control input 1234. In this example, the shaped bit sequence 1251 may correspond to a sequence of amplitudes (from right to left) of 1, 5, 1, 3. The binary labeling element 1240 may convert elements of the sequence of amplitudes to their binary equivalents, resulting in a shaped bit sequence 1242 of 11100110. These eight bits are provided unchanged, as shaped bit sequence 1244, to the parity checking matrix 1250, which adds four parity bits with values, from right to left, of 1, 1, 0, 1, at 1252. These parity bits represent sign bits of +1, +1, −1, and +1, respectively. Sign labeling element 1256 assigns these sign bits, shown as 1258, to the sequence of amplitudes. Combining element 1254 adds the sign bits to the sequence of amplitudes represented in the shaped bit sequence 1251, resulting in a final bit sequence 1260 of 12 bits representing values, from right to left, of 1, 5, −1, 3.

In some embodiments, the subset 1220 may be used in an optical transmission system in which the distribution matcher implements probabilistic amplitude shaping (PAS) and the FEC encoder implements a configurable FEC rate. In such embodiments, subset 1220 also includes, or utilizes, a FEC rate controller 1236 and additional paths through FEC encoder 1206 with which the FEC rate can be controlled. For example, the FEC rate may be controlled using a FEC control value 1226 of r, where r represents the fraction of sign bits with respect to the block size $n_c$. In one example, the number of input bits per block is 10, the number of output bits per block is 12, and 10 bits will be recovered by a FEC decoder of a receiver portion of the optical transmission system. In this example, if the FEC rate control value $r=0.5$, the number of output amplitudes (block size) is given by $n_c=4$, and the bit level (symbol size) is given by $m=3$, the resulting FEC rate $c=(m-1+r)/m=5/6$, which is greater than the minimum FEC rate of $2/3$. Based on the value of r, although there are 10 input bits per block, only 8 input bits are directed to distribution matcher 1204, while the other two inputs bits bypass the distribution matcher 1204. For example, the number of bits selected to bypass the distribution matcher may be given by $r*n_c=2$. In this example, the size of the parity checking matrix may be given as $(m-1+r)*n_c \times m*n_c$.

In this example, the input binary data 1202 includes ten bits with values of 1011110101. The two right-most bits (with values 01) are shown by a dotted line in FIG. 12B as bypass bits 1228. These bits bypass the distribution matcher 1204 and are diverted directly to the FEC encoder 1206 and to sign labeling element 1256. These bypass bits, which will be used as sign bits, may be assigned sign bit values of '0' and '1' in equal numbers, although the original values of these bits in the incoming binary data stream 1202 may be retained for subsequent re-combination with the other eight input bits. The remaining eight bits are provided to the distribution matcher 1204 as input 1230.

In this example, the distribution matcher 1204 creates a shaped bit sequence 1251 in accordance with a target probability distribution based on input 1230 and a shaping control input 1234. As in the previously example, the shaped bit sequence 1251 may correspond to a sequence of amplitudes (from right to left) of 1, 5, 1, 3. The binary labeling element 1240 may convert elements of the sequence of amplitudes to their binary equivalents, resulting in a shaped bit sequence 1242 of 11100110. These eight bits are combined with the bypass bits 1228 and provided, as a 10-bit shaped bit sequence 1244, to the parity checking matrix 1250, which adds two parity bits with values, from right to left, of 1, 1, at 1252. Each of these parity bits represents a sign bit of +1. Sign labeling element 1256 concatenates these two sign bits 1252 and the two bypass bits 1228 (with values, from right to left, representing +1, −1) before assigning them to the sequence of amplitudes. Combining element 1254 adds the sign bits, shown as 1258, to the sequence of amplitudes represented in the shaped bit sequence 1251, resulting in a final bit sequence 1260 of 12 bits 011110101110, where the underlined bits are the added sign bits. This 12-bit sequence represents values, from right to left, of 1, 5, 1, −3. As noted above, with 10 input bits and 12 output bits, the FEC rate is 10/12, or 5/6, which is greater than the minimum FEC rate of 2/3. Note that a higher FEC rate indicates that not as many parity bits are added, thus there is a higher percentage of data bits representing useful information in the signal than when the FEC rate is lower and the number of added parity bits is higher. In various embodiments, a different numbers of bypass bits may be tapped out to bypass the distribution matcher and control or adjust the FEC rate, c.

Figure 13A:
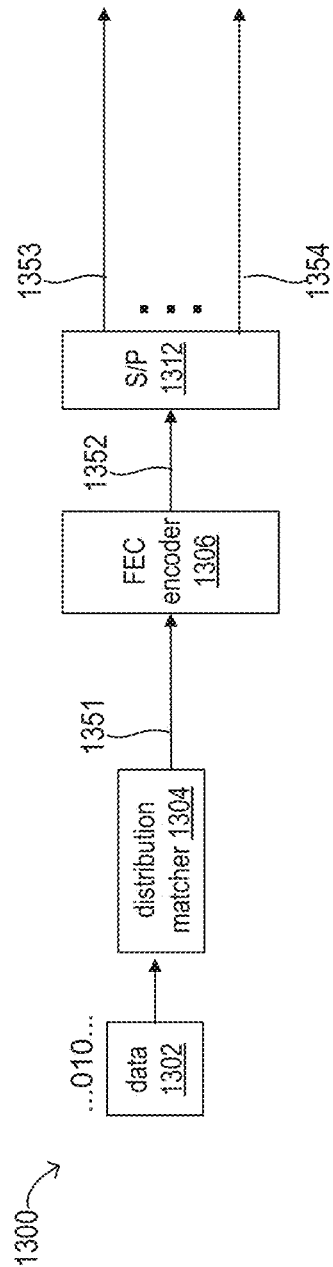
FIG. 13A is a schematic diagram illustrating selected elements of a transmitter portion of an example optical transmission system configured to apply probabilistic constellation shaping and symbol rate optimization and including a single distribution matcher and error correction rate control, according to some embodiments.

FIG. 13A is a schematic diagram illustrating selected elements of a transmitter portion 1300 of an example optical transmission system configured to apply probabilistic constellation shaping and symbol rate optimization and including a single distribution matcher and error correction rate control, according to some embodiments. For example, transmitter portion 1300 may be configured to perform probabilistic shaping based on M-QAM, in addition to performing symbol rate optimization using subcarrier multiplexing. In the illustrated embodiment, some, but not all, of the elements of the transmitter portion 1300 of the optical transmission system may be similar to elements of the transmitter portion of optical transmission system 400 illustrated in FIG. 4 or the transmitter portion 600 illustrated in FIG. 6A. The depiction of transmitter portion 1300 is a schematic representation and is not drawn to scale. In various embodiments, transmitter portion 1300 may be implemented with more, fewer, or different elements than those depicted in FIG. 13A. In some embodiments, transmitter portion 1300 may include a field-programmable gate array (FPGA) for performing at least some of the functionality described herein. In some embodiments, transmitter portion 1300 may include a digital signal processor (DSP), which may include (or have access to) a memory storing instructions executable by the DSP for performing at least some of the functionality described herein. In the illustrated embodiment, the transmitter portion 1300 includes binary data 1302 that is provided for transmission to a receiver portion of the optical transmission system. In at least some embodiments, transmitter portion 1300 illustrated in FIG. 13A may represent one of two transmitter portions of the optical transmission system, each of which is configured to generate the real (I) portion or imaginary (Q) portion of the data 1302 for optical modulation that is converted to analog signals by a respective digital to analog converter (DAC).

The transmitter portion 1300 includes binary data 1302 that is provided for transmission to a receiver portion of the optical transmission system. In the illustrated embodiment, the incoming binary data 1302 is provided to a single distribution matcher 1304 as a single serial binary data stream. The output of the distribution matcher 1304 is a shaped bit sequence 1351, which is provided to a single systematic FEC encoder 1306. In one example, the number of possible amplitudes (block size) is given by $n_c=4$, and the bit level (symbol size) is given by m=3, resulting in a FEC rate c=(m−1)/m=2/3. In this example, the number of input bits per block is 8, the number of output bits per block is 12, and 8 bits will be recovered by a FEC decoder of a receiver portion of the optical transmission system. In this example, the output of distribution matcher 1304, shown as the shaped bit sequence 1351, includes eight bits with values of 10110010, where the number of bits is k(m−1). Shaped bit sequence 1351 represents two probability amplitude bits for each of four symbols, where, reading from right to left, a first symbol includes the two bold probability amplitude bits 10. a second symbol includes the two italicized probability amplitude bits 00, a third symbol includes the two bold and italicized probability amplitude bits 11, and a fourth symbol includes the two regular probability amplitude bits 10.

The single systematic FEC encoder 1306 applies k parity bits as sign bits across the probabilities represented in the shaped bit sequence 1351 to generate a final shaped bit sequence 1352. In this example, FEC encoder 1306 adds four parity bits, with values of 1001, as sign bits to generate the final shaped bit sequence. In the illustrated embodiment, a serial-to-parallel converter 1312 splits the final shaped bit sequence into n streams, each directed to a respective processing path for further processing in parallel. In at least some embodiments, there is a one-to-one mapping between the n parallel processing paths and n subcarrier channels over which information represented in binary data 1302 is carried from the transmitter portion 1300 to the receiver portion. In the illustrated embodiment, the serial-to-parallel converter 1312 is configured to apply symbol-wise serial-to-parallel conversion. In this example, the input to the upper processing path, shown as 1353, includes six bits with values of 011110, which includes added sign bits as respective underlined bits prepended to the 2-bit amplitude values associated with the first and third symbols. The input to the lower processing path, shown as 1354, includes six bits with values of 110000, which includes added sign bits as respective underlined bits prepended to the 2-bit amplitude values associated with the second and fourth symbols.

Like transmitter portion 1200 illustrated in FIG. 12A, transmitter portion 1300 includes multiple symbol mappers, multiple Nyquist filtering elements, and multiple frequency shifting elements (not shown in FIG. 13A). For example, in at least some embodiments, for each subcarrier 1 to n, transmitter portion 1300 may perform symbol mapping and Nyquist filtering before frequency shifting (FS) is applied. In the illustrated embodiment, the outputs of the multiple processing paths, each of which includes binary data representing various codewords, are combined by a single subcarrier multiplexer for transmission to the optical receiver over the optical transmission path using subcarrier multiplexing (not shown in FIG. 13A). For example, the subcarrier multiplexer may be configured to combine the individual subcarrier data output by the multiple processing paths into either the real (I) portion or the imaginary (Q) portion of the optical signal to be transmitted.

Figure 13B:
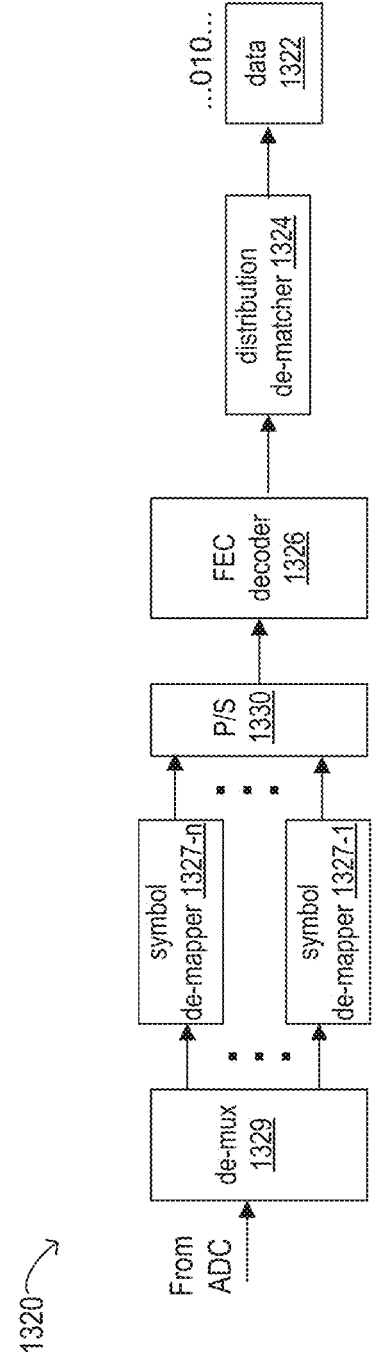
FIG. 13B is a schematic diagram illustrating selected elements of a receiver portion of an example optical transmission system configured to recover information from optical signals received from the transmitter portion depicted in FIG. 13A, according to some embodiments.

FIG. 13B is a schematic diagram illustrating selected elements of a receiver portion 1320 of an example optical transmission system configured to recover information from optical signals received from the transmitter portion depicted in FIG. 13A, according to some embodiments. In the illustrated embodiment, at least some of the elements of the receiver portion 1320 of the optical transmission system are similar to elements of the receiver portion of optical transmission system 400 illustrated in FIG. 4 or the receiver portion 620 illustrated in FIG. 6B. The depiction of receiver portion 1320 is a schematic representation and is not drawn to scale. In various embodiments, receiver portion 1320 may be implemented with more, fewer, or different elements than those depicted in FIG. 13B. In some embodiments, receiver portion 1320 may include a field-programmable gate array (FPGA) for performing at least some of the functionality described herein. In some embodiments, receiver portion 1320 may include a digital signal processor (DSP), which may include (or have access to) a memory storing instructions executable by the DSP for performing at least some of the functionality described herein. In the illustrated embodiment, the receiver portion 1320 receives, from an analog-to-digital converter, a digitized signal for a transmitted optical signal in a coherent optical receiver of the optical transmission system. In at least some embodiments, receiver portion 1320 illustrated in FIG. 13B may represent one of two receiver portions of the optical transmission system, each of which is configured to receive binary data representing the real (I) portion or imaginary (Q) portion of the optical signal received from the transmitter portion of the optical transmission system, respectively.

In the illustrated embodiment, the receiver portion 1320 includes a single subcarrier de-multiplexer 1329 that splits the incoming optical signal into n streams, each initially directed to a respective processing path for processing in parallel. In some embodiments, subcarrier de-multiplexer 1329 may include an adaptive equalizer, a carrier phase recovery element, or other functional elements of an optical receiver (not shown in FIG. 13B). In at least some embodiments, there is a one-to-one mapping between the n parallel processing paths and n subcarrier channels over which information is received from the transmitter portion 1300.

In the illustrated embodiment, receiver portion 1320 includes multiple symbol de-mappers 1327, including one for each of the parallel streams. Receiver portion 1320 includes a parallel-to-serial converter 1330 that combines the outputs of the multiple symbol de-mappers 1327, using symbol-wise parallel-to-serial conversion, and provides an intermediate combined output to a single FEC decoder 1326. The single FEC decoder 1326 extracts the parity bits that were applied by FEC encoder 1306 in the transmitter portion 1300 as sign bits of the respective probabilities represented in the intermediate combined shaped bit sequence. The output of FEC decoder 1326 is provided to a single distribution de-matcher 1324, which recovers the transmitted information as data 1322. For example, distribution de-matcher 1324 may be configured to recover data representing either the real (I) portion or the imaginary (Q) portion of the received optical signal.

Figure 14A:
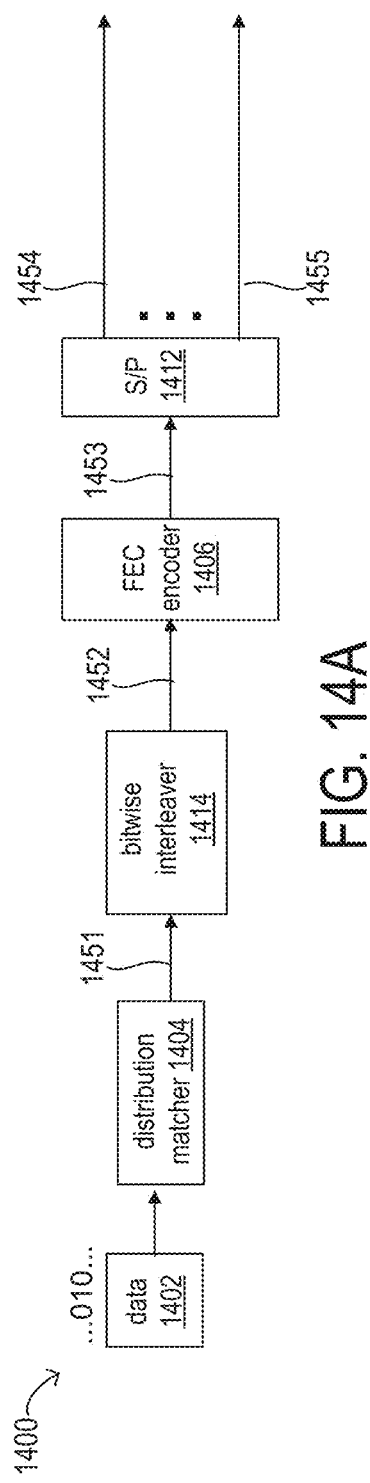
FIG. 14A is a schematic diagram illustrating selected elements of a transmitter portion of an example optical transmission system configured to apply probabilistic constellation shaping and symbol rate optimization and including a single distribution matcher and a bitwise interleaver, according to some embodiments.

FIG. 14A is a schematic diagram illustrating selected elements of a transmitter portion 1400 of an example optical transmission system configured to apply probabilistic constellation shaping and symbol rate optimization and including a single distribution matcher 1404 and a bitwise interleaver 1414, according to some embodiments. For example, transmitter portion 1400 may be configured to perform probabilistic shaping based on M-QAM, in addition to performing symbol rate optimization using subcarrier multiplexing. In the illustrated embodiment, some, but not all, of the elements of the transmitter portion 1400 of the optical transmission system may be similar to elements of the transmitter portion of optical transmission system 400 illustrated in FIG. 4 or the transmitter portion 600 illustrated in FIG. 6A. The depiction of transmitter portion 1400 is a schematic representation and is not drawn to scale. In various embodiments, transmitter portion 1400 may be implemented with more, fewer, or different elements than those depicted in FIG. 14A. In some embodiments, transmitter portion 1400 may include a field-programmable gate array (FPGA) for performing at least some of the functionality described herein. In some embodiments, transmitter portion 1400 may include a digital signal processor (DSP), which may include (or have access to) a memory storing instructions executable by the DSP for performing at least some of the functionality described herein. In the illustrated embodiment, the transmitter portion 1400 includes binary data 1402 that is provided for transmission to a receiver portion of the optical transmission system. In at least some embodiments, transmitter portion 1400 illustrated in FIG. 14A may represent one of two transmitter portions of the optical transmission system, each of which is configured to generate the real (I) portion or imaginary (Q) portion of the data 1402 for optical modulation that is converted to analog signals by a respective digital to analog converter (DAC).

The transmitter portion 1400 includes binary data 1402 that is provided for transmission to a receiver portion of the optical transmission system. In the illustrated embodiment, the incoming binary data 1402 is provided to a single distribution matcher 1404 as a single serial binary data stream. The output of the distribution matcher 1404 is a shaped bit sequence 1451, which is provided to bitwise interleaver 1414. The output of the bitwise interleaver 1414, shown as 1452, is provided to a single systematic FEC encoder 1406. In one example, the number of output amplitudes (block size) is given by $n_c=4$, and the bit level (symbol size) is given by m=3, resulting in a FEC rate c=(m−1)/m=⅔. In this example, the number of input bits per block is 8, the number of output bits per block is 12, and 8 bits will be recovered by a FEC decoder of a receiver portion of the optical transmission system. In this example, the output of distribution matcher 1404, shown as the shaped bit sequence 1451, includes eight bits with values of 10110010, where the number of bits is k(m−1). Shaped bit sequence 1451 represents two probability amplitude bits for each of four symbols, where, reading from right to left, a first symbol includes the two bold probability amplitude bits 10. a second symbol includes the two italicized probability amplitude bits 00, a third symbol includes the two bold and italicized probability amplitude bits 11, and a fourth symbol includes the two regular probability amplitude bits 10.

In this example, bitwise interleaver 1414 receives the shaped bit sequence 1451 and applies bitwise interleaving to produce an intermediate shaped bit sequence 1452. Intermediate shaped bit sequence 1452 includes eight bits with values 11010100.

The single systematic FEC encoder 1406 applies k parity bits as sign bits across the probabilities represented in the intermediate shaped bit sequence 1452 to generate a final shaped bit sequence 1453. In this example, FEC encoder 1406 adds four parity bits, with values of 1011, as sign bits to generate the final shaped bit sequence. In the illustrated embodiment, a serial-to-parallel converter 1412 splits the final shaped bit sequence into n streams, each directed to a respective processing path for further processing in parallel. In at least some embodiments, there is a one-to-one mapping between the n parallel processing paths and n subcarrier channels over which information represented in binary data 1402 is carried from the transmitter portion 1400 to the receiver portion. In this example, the input to the upper processing path, shown as 1454, includes six bits with values of 011110, which includes added sign bits as respective underlined bits prepended to the 2-bit amplitude values associated with the first and third symbols. The input to the lower processing path, shown as 1455, includes six bits with values of 110100, which includes added sign bits as respective underlined bits prepended to the 2-bit amplitude values associated with the second and fourth symbols. Note that, if the values of the four parity bits added to the intermediate shaped bit sequence 1452 had been the same as the values of the four parity bits added to the shaped bit sequence 1351 shown in FIG. 13A, both of the shaped bit sequences 1353 and 1354 shown in FIG. 13A would include the same bit values as the shaped bit sequences 1454 and 1455 shown in FIG. 14A, respectively.

Like transmitter portion 1200 illustrated in FIG. 12A, transmitter portion 1400 includes multiple symbol mappers, multiple Nyquist filtering elements, and multiple frequency shifting elements (not shown in FIG. 14A). As illustrated in FIG. 14A, in at least some embodiments, for each subcarrier 1 to n, transmitter portion 1400 may perform symbol mapping and Nyquist filtering before frequency shifting (FS) is applied. The outputs of the multiple processing paths, each of which includes binary data representing various codewords, are combined by a single subcarrier multiplexer for transmission to the optical receiver over the optical transmission path using subcarrier multiplexing (not shown in FIG. 14A). The subcarrier multiplexer may be configured to combine the individual subcarrier data output by the multiple processing paths into either the real (I) portion or the imaginary (Q) portion of the optical signal to be transmitted.

Figure 14B:
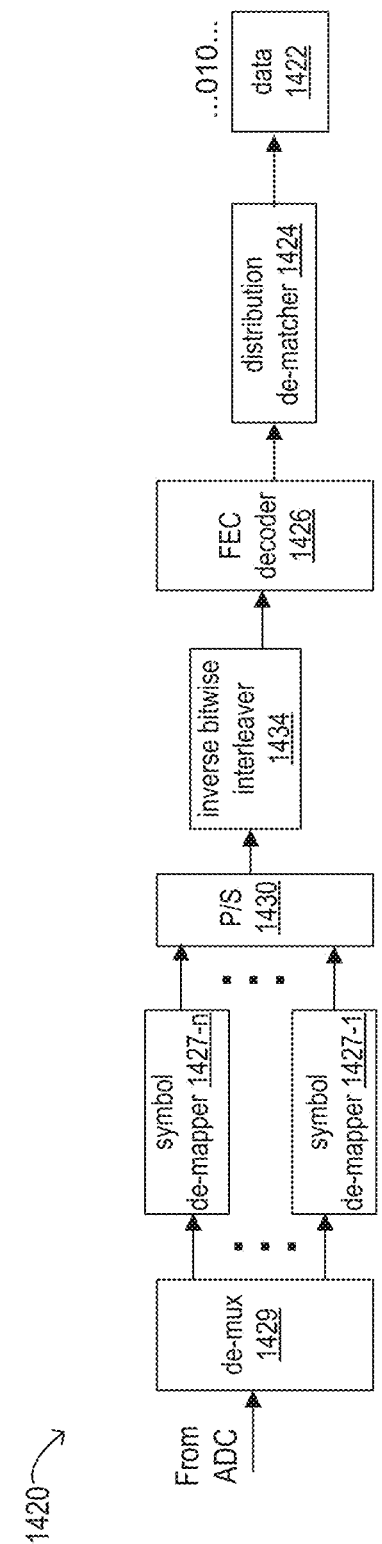
FIG. 14B is a schematic diagram illustrating selected elements of a receiver portion of an example optical transmission system configured to recover information from optical signals received from the transmitter portion depicted in FIG. 14A, according to some embodiments.

FIG. 14B is a schematic diagram illustrating selected elements of a receiver portion 1420 of an example optical transmission system configured to recover information from optical signals received from the transmitter portion depicted in FIG. 14A, according to some embodiments. In the illustrated embodiment, at least some of the elements of the receiver portion 1420 of the optical transmission system are similar to elements of the receiver portion of optical transmission system 400 illustrated in FIG. 4 or the receiver portion 620 illustrated in FIG. 6B. The depiction of receiver portion 1420 is a schematic representation and is not drawn to scale. In various embodiments, receiver portion 1420 may be implemented with more, fewer, or different elements than those depicted in FIG. 14B. In some embodiments, receiver portion 1420 may include a field-programmable gate array (FPGA) for performing at least some of the functionality described herein. In some embodiments, receiver portion 1420 may include a digital signal processor (DSP), which may include (or have access to) a memory storing instructions executable by the DSP for performing at least some of the functionality described herein. In the illustrated embodiment, the receiver portion 1420 receives, from an analog-to-digital converter, a digitized signal for a transmitted optical signal in a coherent optical receiver of the optical transmission system. In at least some embodiments, receiver portion 1420 illustrated in FIG. 14B may represent one of two receiver portions of the optical transmission system, each of which is configured to receive binary data representing the real (I) portion or imaginary (Q) portion of the optical signal received from the transmitter portion of the optical transmission system, respectively.

In the illustrated embodiment, the receiver portion 1420 includes a single subcarrier de-multiplexer 1429 that splits the incoming optical signal into n streams, each initially directed to a respective processing path for processing in parallel. In some embodiments, subcarrier de-multiplexer 1429 may include an adaptive equalizer, a carrier phase recovery element, or other functional elements of an optical receiver (not shown in FIG. 14B). In at least some embodiments, there is a one-to-one mapping between the n parallel processing paths and n subcarrier channels over which information is received from the transmitter portion 1400.

In the illustrated embodiment, receiver portion 1420 includes multiple symbol de-mappers 1427, including one for each of the parallel streams. Receiver portion 1420 includes a parallel-to-serial converter 1430 that combines the outputs of the multiple symbol de-mappers 1427 and provides an intermediate combined output to an inverse bitwise interleaver 1434 that reverses the effects of the bitwise interleaver 1414 in transmitter portion 1400. The output of inverse bitwise interleaver 1434 is provided to a single FEC decoder 1426. The single FEC decoder 1426 extracts the parity bits that were applied by FEC encoder 1406 in the transmitter portion 1400 as sign bits of the respective probabilities represented in the intermediate combined shaped bit sequence. The output of FEC decoder 1426 is provided to a single distribution de-matcher 1424, which recovers transmitted information as data 1422. For example, distribution de-matcher 1424 may be configured to recover data representing either the real (I) portion or the imaginary (Q) portion of the received optical signal.

Figure 15A:
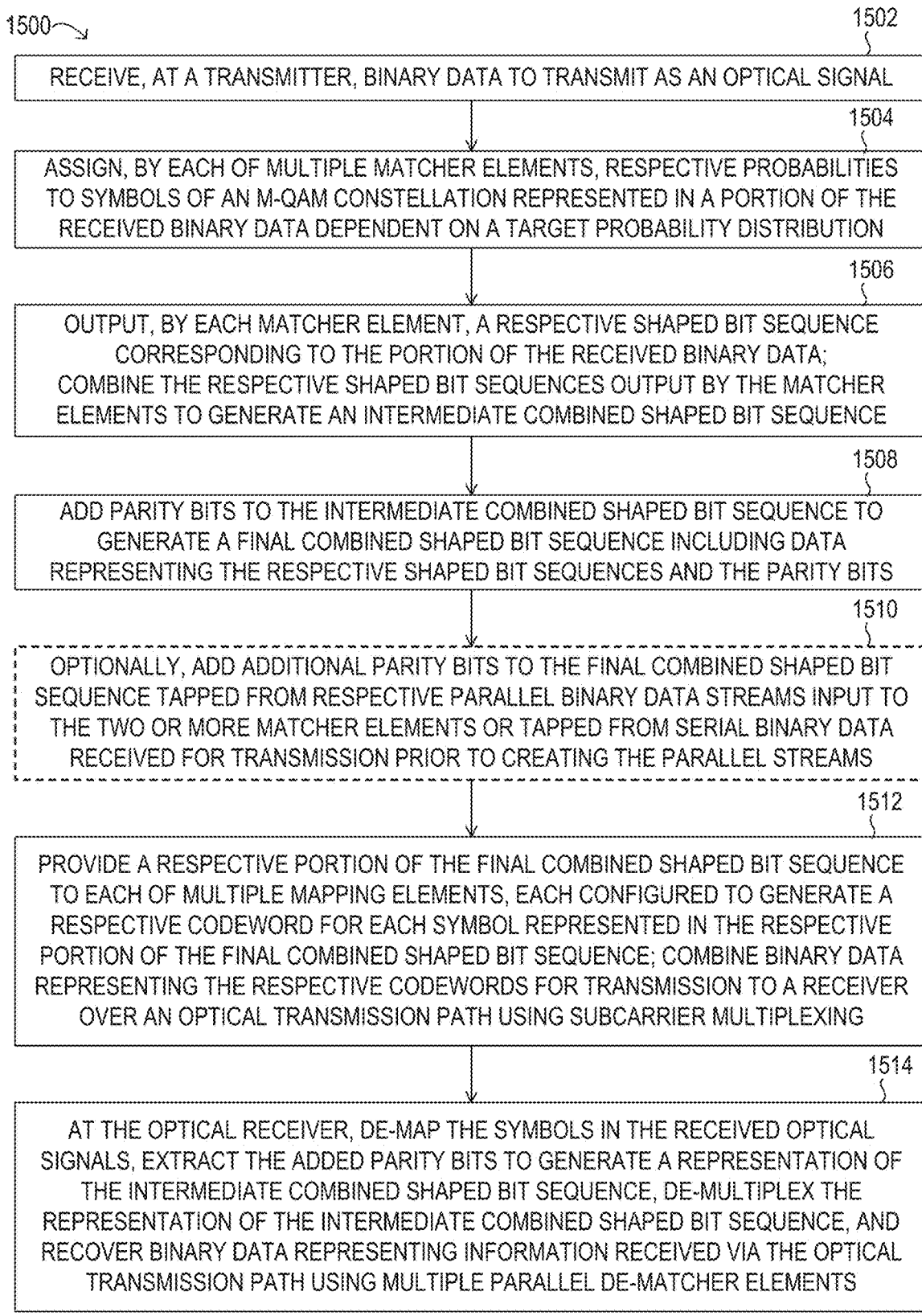
FIG. 15A is a block diagram of selected elements of an embodiment of method for error correction in optical networks that implement both probabilistic shaping and symbol rate optimization and that include multiple distribution matchers depicted in flowchart form.

FIG. 15A is a block diagram of selected elements of an embodiment of method 1500 for error correction in optical networks that implement both probabilistic shaping and symbol rate optimization and that include multiple distribution matchers depicted in flowchart form. Method 1500 may be performed using optical transport network 101. In some embodiments, network management system 300 illustrated in FIG. 3 may be used to obtain path information as well as send commands to optical transmitters and optical receivers to configure them for probabilistic constellation shaping and symbol rate optimization using subcarrier multiplexing, as described herein. It is noted that certain operations described in method 1500 may be optional or may be rearranged in different embodiments.

At 1502, method 1500 includes receiving, at an optical transmitter, binary data to be transmitted, to an optical receiver, as an optical signal over a transmission path.

At 1504, the method includes assigning, by each of multiple matcher elements, respective probabilities to symbols of an M-QAM constellation of a given M-QAM modulation format in the complex plane represented in a portion of the binary data received by the matcher element dependent on a target probability distribution. Each of the matcher elements may be similar to distribution matcher 404 illustrated in FIG. 4 or one of the distribution matchers 604 illustrated in FIG. 6A.

At 1506, method 1500 includes outputting, by each matcher element, a respective shaped bit sequence corresponding to the portion of the binary data received by the matcher element and combining the respective shaped bit sequences output by the matcher elements to generate an intermediate combined shaped bit sequence.

At 1508, the method includes adding parity bits to the intermediate combined shaped bit sequence to generate a final combined shaped bit sequence including data representing the respective shaped bit sequences and the parity bits. In at least some embodiments, a single systematic error correction encoder may be configured to add parity bits collectively across the shaped bit sequences represented in the intermediate combined shaped bit sequence without changing the amplitudes of the symbols represented in the shaped bit sequences. For example, a single systematic FEC encoder may add the parity bits as sign bits that are applied across the shaped bit sequences represented in the intermediate combined shaped bit sequence.

At 1510, method 1500 may, optionally, include adding additional parity bits to the final combined shaped bit sequence tapped from respective parallel binary data streams input to the two or more matcher elements (as shown in FIG. 10A and described above) or tapped from serial binary data received for transmission prior to creating the parallel streams (as shown in FIG. 11A and described above). For example, the single systematic FEC encoder may add the additional parity bits as additional sign bits that are applied across the shaped bit sequences represented in the intermediate combined shaped bit sequence, again without changing the amplitudes of the symbols represented in the shaped bit sequences.

At 1512, the method includes providing a respective portion of the final combined shaped bit sequence to each of multiple mapping elements, each of which is configured to generate a respective codeword for each symbol represented in the respective portion of the final combined shaped bit sequence provided to the mapping element, and combining binary data representing the respective codewords for transmission to the optical receiver over an optical transmission path using subcarrier multiplexing.

At 1514, method 1500 includes, at the optical receiver, de-mapping the symbols in the received optical signals, extracting the added parity bits to generate a representation of the intermediate combined shaped bit sequence, de-multiplexing the representation of the intermediate combined shaped bit sequence, and recovering binary data representing information received via the optical transmission path using multiple parallel de-matcher elements. In some embodiments, in addition to extracting the added parity bits, a FEC decoder of the optical receiver may also be configured to use the error correction codes in the received optical signals to check the integrity of the received data and/or to correct certain errors in the data based on the error correction codes.

Figure 15B:
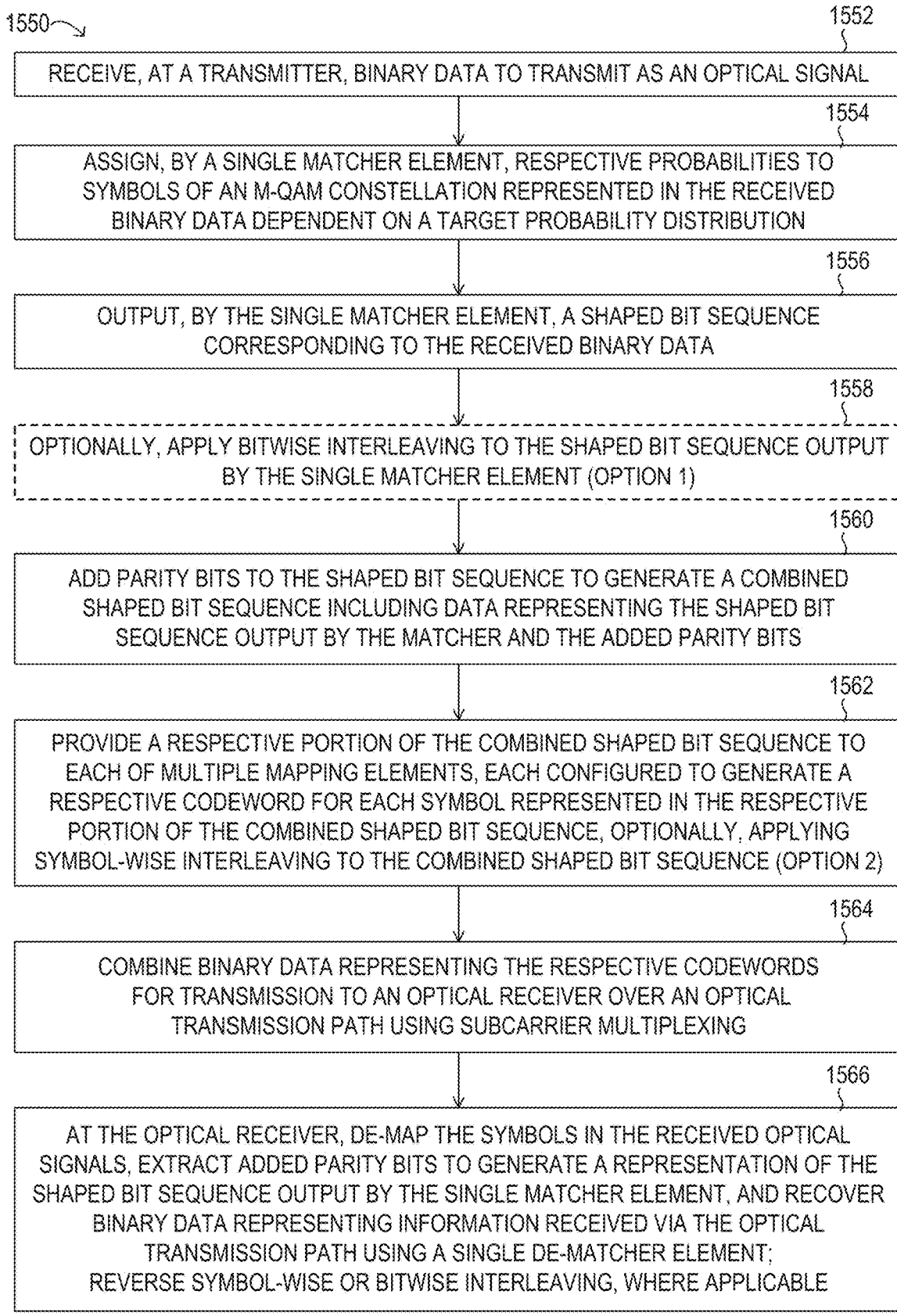
FIG. 15B is a block diagram of selected elements of an embodiment of method for error correction in optical networks that implement both probabilistic shaping and symbol rate optimization and that include a single distribution matcher depicted in flowchart form.

FIG. 15B is a block diagram of selected elements of an embodiment of method 1550 for error correction in optical networks that implement both probabilistic shaping and symbol rate optimization and that include a single distribution matcher depicted in flowchart form. Method 1550 may be performed using optical transport network 101. In some embodiments, network management system 300 illustrated in FIG. 3 may be used to obtain path information as well as send commands to optical transmitters and optical receivers to configure them for probabilistic constellation shaping and symbol rate optimization using subcarrier multiplexing, as described herein. It is noted that certain operations described in method 1550 may be optional or may be rearranged in different embodiments.

At 1552, method 1550 includes receiving, at an optical transmitter, binary data to be transmitted, to an optical receiver, as an optical signal over a transmission path.

At 1554, the method includes assigning, by a single matcher element, respective probabilities to symbols of an M-QAM constellation of a given M-QAM modulation format in the complex plane represented in the received binary data dependent on a target probability distribution. The single matcher element may be similar to distribution matcher 404 illustrated in FIG. 4 or one of the distribution matchers 604 illustrated in FIG. 6A.

At 1556, method 1550 includes outputting, by the single matcher element, a shaped bit sequence corresponding to the received binary data.

At 1558, the method may, optionally, include applying bitwise interleaving to the shaped bit sequence output by the single matcher element, as described above in reference to FIG. 13A.

At 1560, method 1550 includes adding parity bits to the shaped bit sequence to generate a combined shaped bit sequence including data representing the shaped bit sequence output by the matcher, with or without optional interleaving, and the added parity bits. In at least some embodiments, a single systematic error correction encoder may be configured to add parity bits across shaped bit sequences without changing the amplitudes of the symbols represented in the shaped bit sequences. For example, as described above in reference to FIGS. 13A and 14A, a single systematic FEC encoder may add the parity bits as sign bits that are applied across the probabilities represented in the shaped bit sequence output by the single matcher element.

At 1562, the method includes providing a respective portion of the combined shaped bit sequence to each of multiple mapping elements, each configured to generate a respective codeword for each symbol represented in the respective portion of the combined shaped bit sequence. The method may, optionally, include applying symbol-wise interleaving to the combined shaped bit sequence, as described above in reference to FIG. 14A.

At 1564, method 1550 includes combining binary data representing the respective codewords for transmission to the optical receiver over an optical transmission path using subcarrier multiplexing.

At 1566, the method includes, at the optical receiver, de-mapping the symbols in the received optical signals, extracting added parity bits to generate a representation of the shaped bit sequence output by the single matcher element, and recovering binary data representing information received via the optical transmission path using a single de-matcher element. The method may also include, at the optical received, reversing any symbol-wise or bitwise interleaving performed at the optical transmitter, where applicable. In some embodiments, in addition to extracting the added parity bits, a FEC decoder of the optical receiver may also be configured to use the error correction codes in the received optical signals to check the integrity of the received data and/or to correct certain errors in the data based on the error correction codes.

Note that, for simplicity, the number of input bits processed together as an input block in several examples described herein is eight. However, in practice, the number of input bits processed together may be much higher. For example, in one embodiment, the number of input bits processed together may be 80. In this example, 40 parity checking bits may be added for an output block size of 120 bits. In other embodiments, the input block size may be one hundred bits or more, with the number of added parity check bits being dependent on the desired FEC rate.

As described in detail herein, optical transmission systems that implement both probabilistic shaping and symbol rate optimization using subcarrier multiplexing may apply a type of "FEC interleaving" between subcarriers to average out the performance of the subcarriers and improve the overall performance of the system, compared to systems that apply FEC encoding on a per-subcarrier channel basis. For example, a systematic FEC encoder may apply systematic error correction encoding collectively and across the bit streams for all subcarriers generated by one or more distribution matchers to average out the performance of the subcarrier channels. The systematic FEC encoder may apply parity bits to shaped bit sequences as sign bits, without changing the amplitude of each symbol representing in the shaped bit sequences. The ability to perform FEC encoding without changing the amplitude of each symbol may be essential for correctly implementing probabilistic shaping in conjunction with symbol rate optimization.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. An optical transmitter for probabilistic shaping and symbol rate optimization, comprising:
   one or more matcher elements, each of the one or more matcher elements configured to:
      assign respective probabilities to symbols of a Multi-level Quadrature Amplitude Modulation (M-QAM) constellation of a given M-QAM modulation format in a complex plane represented in binary data received by the matcher element, the assignment being dependent on a target probability distribution for the symbols; and
      output a respective shaped bit sequence corresponding to the binary data received by the matcher element;
   a single systematic error correction encoder configured to:
      add parity bits to the respective shaped bit sequences collectively across the respective shaped bit sequences; and
      output a first combined shaped bit sequence including data representing the respective shaped bit sequences and the collectively added parity bits;
   a plurality of mapping elements, each configured to generate a respective codeword for each symbol represented in a received portion of the first combined shaped bit sequence;
   a first serial-to-parallel converter configured to provide a respective portion of the first combined shaped bit sequence to each of the plurality of mapping elements; and
   a multiplexer configured to combine binary data representing the respective codewords generated by the plurality of mapping elements for transmission over an optical transmission path using subcarrier multiplexing.

2. The optical transmitter of claim 1, wherein a number of mapping elements is equal to a number of subcarrier channels selected for symbol rate optimization and is dependent on characteristics of transmission media for the optical transmission path and a target reach for the transmission.

3. The optical transmitter of claim 1, wherein:
   the one or more matcher elements comprises two or more matcher elements; and
   the optical transmitter further includes a first parallel-to-serial converter configured to:
      combine the respective shaped bit sequences output by the two or more matcher elements to generate binary data representing a second combined shaped bit sequence; and
      provide the binary data representing the second combined shaped bit sequence to the single systematic error correction encoder as input.

4. The optical transmitter of claim 3, further comprising:
   a second serial-to-parallel converter configured to provide respective portions of binary data received by the optical transmitter to each of the two more matcher elements in parallel binary data streams; and
   a plurality of tap elements, each configured to:
      tap one or more bits from each of the parallel binary data streams; and
      provide the one or more tapped bits to a second parallel-to-serial converter;
   wherein the second parallel-to-serial converter is further configured to provide the one or more tapped bits received from each of the plurality of tap elements to the single systematic error correction encoder as parity bits to be added collectively across the respective shaped bit sequences output by the two or more matcher elements.

5. The optical transmitter of claim 4, wherein:
   the optical transmitter further comprises a combining element;
   each of the plurality of tap elements is further configured to provide the one or more tapped bits to the combining element; and
   the combining element is configured to integrate the tapped bits provided by the plurality of tap elements into the first combined shaped bit sequence prior to providing the first combined shaped bit sequence to the first serial-to-parallel converter as input.

6. The optical transmitter of claim 3, further comprising:
   a second serial-to-parallel converter configured to provide respective portions of serial binary data received by the optical transmitter to each of the two more matcher elements in parallel binary data streams; and
   a tap element configured to:
      tap one or more bits from the serial binary data received by the optical transmitter prior to converting the serial binary data to the parallel binary data streams; and
      provide the one or more tapped bits to the single systematic error correction encoder as parity bits to be added collectively across the respective shaped bit sequences output by the two or more matcher elements.

7. The optical transmitter of claim 6, wherein:
   the optical transmitter further comprises a combining element;
   the tap element is further configured to provide the one or more tapped bits to the combining element; and
   the combining element is configured to integrate the tapped bits provided by the tap element into the first combined shaped bit sequence prior to providing the first combined shaped bit sequence to the first serial-to-parallel converter as input.

8. The optical transmitter of claim 1, wherein the one or more matcher elements comprises a single matcher element.

9. The optical transmitter of claim 8, wherein:
   the single systematic error correction encoder is communicatively coupled to the single matcher element and configured to receive a shaped bit sequence corresponding to the binary data received by the single matcher element from the single matcher element; and
   the first serial-to-parallel converter is configured to apply symbol-wise interleaving to the first combined shaped bit sequence to provide a respective portion of the first combined shaped bit sequence to each of the plurality of mapping elements.

10. The optical transmitter of claim 8, further comprising a bitwise interleaving element configured to:
    receive the first combined shaped bit sequence from the single matcher element;
    apply bitwise interleaving to the first combined shaped bit sequence to generate binary data representing a second combined shaped bit sequence; and
    provide the binary data representing the second combined shaped bit sequence to the single systematic error correction encoder as input.

11. A method for error correction in optical networks with probabilistic shaping and symbol rate optimization, comprising:
    receiving binary data to be transmitted as an optical signal;

assigning, by each of one or more matcher elements, respective probabilities to symbols of a Multilevel Quadrature Amplitude Modulation (M-QAM) constellation of a given M-QAM modulation format in a complex plane represented in a portion of the received binary data provided to the matcher element, the assigning being dependent on a target probability distribution for the symbols;

outputting, by each of the one or more matcher elements, a respective shaped bit sequence corresponding to the portion of the received binary data provided to the matcher element;

adding, collectively across the respective shaped bit sequences, parity bits to the respective shaped bit sequences to generate a first combined shaped bit sequence including data representing the respective shaped bit sequences and the collectively added parity bits;

providing a respective portion of the combined shaped bit sequence to each of a plurality of mapping elements, each mapping element being configured to generate a respective codeword for each symbol represented in the respective portion of the combined shaped bit sequence provided to the mapping element; and combining binary data representing the respective codewords generated by the plurality of mapping elements for transmission over an optical transmission path using subcarrier multiplexing.

12. The method of claim 11, wherein a number of mapping elements is equal to a number of subcarrier channels selected for symbol rate optimization and is dependent on characteristics of transmission media for the optical transmission path and a target reach for the transmission.

13. The method of claim 11, wherein:
the one or more matcher elements comprises two or more matcher elements;
the method further includes combining the respective shaped bit sequences output by the two or more matcher elements to generate binary data representing a second combined shaped bit sequence; and
adding, collectively across the respective shaped bit sequences, parity bits to the respective shaped bit sequences comprises adding the parity bits to the second combined shaped bit sequence.

14. The method of claim 13, further comprising:
receiving, via the optical transmission path, binary data representing the first combined shaped bit sequence;
extracting the collectively added parity bits from the binary data representing the first combined shaped bit sequence;
outputting a third combined shaped bit sequence from which the collectively added parity bits have been extracted;
providing respective portions of the third combined shaped bit sequence to each of two or more de-matcher elements; and
recovering, by each of the two or more de-matcher elements and from the respective portion of the third combined shaped bit sequence, binary data representing information received via the optical transmission path.

15. The method of claim 13, wherein:
the method further comprises:
providing respective portions of serial binary data for transmission to each of the two more matcher elements in parallel binary data streams; and
tapping one or more bits from each of the parallel binary data streams; and
adding, collectively across the respective shaped bit sequences, parity bits to the respective shaped bit sequences further comprises adding, to the second combined shaped bit sequence, the one or more tapped bits received from each of the plurality of tap elements as additional parity bits.

16. The method of claim 13, wherein:
the method further comprises:
providing respective portions of serial binary data for transmission to each of the two more matcher elements in parallel binary data streams; and
tapping one or more bits from a serial binary data received by the optical transmitter prior to converting the serial binary data to the parallel binary data streams; and
adding, collectively across the respective shaped bit sequences, parity bits to the respective shaped bit sequences further comprises adding, to the second combined shaped bit sequence, the one or more tapped bits from the received serial binary data as additional parity bits.

17. The method of claim 11, wherein the one or more matcher elements comprises a single matcher element.

18. The method of claim 17, further comprising:
receiving, via the optical transmission path, binary data representing the first combined shaped bit sequence;
extracting the collectively added parity bits from the binary data representing the first combined shaped bit sequence;
outputting a second combined shaped bit sequence from which the collectively added parity bits have been extracted;
providing the second combined shaped bit sequence to a single de-matcher element; and
recovering, by the single de-matcher element and from the second combined shaped bit sequence, binary data representing information received via the optical transmission path.

19. The method of claim 17, wherein providing a respective portion of the combined shaped bit sequence to each of the plurality of mapping elements comprises applying symbol-wise interleaving to the first combined shaped bit sequence.

20. The method of claim 17, wherein:
the method further comprises:
receiving the first combined shaped bit sequence from the single matcher element; and
applying bitwise interleaving to the first combined shaped bit sequence to generate binary data representing a second combined shaped bit sequence; and
providing the binary data representing the second combined shaped bit sequence to a single systematic error correction encoder as input.

* * * * *